(12) United States Patent
Sun et al.

(10) Patent No.: US 11,856,065 B2
(45) Date of Patent: Dec. 26, 2023

(54) DATA TRANSMISSION FOR SERVICE INTEGRATION BETWEEN A VIRTUAL PRIVATE CLOUD AND AN INTRANET

(71) Applicant: Tencent Technology (Shenzhen) Company Limited, Guangdong (CN)

(72) Inventors: Bin Sun, Shenzhen (CN); Yunfan Li, Shenzhen (CN); Kexin Li, Shenzhen (CN); Mingbo Huang, Shenzhen (CN); Xuan Feng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/991,474

(22) Filed: Nov. 21, 2022

(65) Prior Publication Data

US 2023/0078546 A1 Mar. 16, 2023

Related U.S. Application Data

(63) Continuation of application No. PCT/CN2022/082006, filed on Mar. 21, 2022.

(30) Foreign Application Priority Data

Apr. 1, 2021 (CN) ......................... 202110353970.X

(51) Int. Cl.
*H04L 67/141* (2022.01)
*H04L 67/51* (2022.01)
(Continued)

(52) U.S. Cl.
CPC ............ *H04L 67/141* (2013.01); *H04L 67/51* (2022.05); *H04L 67/56* (2022.05); *H04L 67/63* (2022.05)

(58) Field of Classification Search
CPC ....... H04L 67/141; H04L 67/51; H04L 67/56; H04L 67/63; H04L 69/16; H04L 67/10
See application file for complete search history.

(56) References Cited

U.S. PATENT DOCUMENTS 10,171,292 B1 * 1/2019 Dolan ................. H04L 41/0803
10,880,273 B2   12/2020 May
(Continued)

FOREIGN PATENT DOCUMENTS

| CN | 110535964 A | 12/2019 |
| CN | 110545205 A | 12/2019 |

(Continued)

OTHER PUBLICATIONS

Clouder, Alibaba, "Setting up an Intranet Connection between VPCs with Express Connect", Feb. 25, 2020, https://www.alibabacloud.com/blog/setting-up-an-intranet-connection-between-vpcs-with-express-connect_595887 (Year: 2020).*

(Continued)

*Primary Examiner* — Ramy M Osman
(74) *Attorney, Agent, or Firm* — ARENTFOX SCHIFF LLP

(57) ABSTRACT

A data transmission method includes receiving, by a gateway of an integration platform as a service (iPaaS) system, a data transmission request transmitted by the iPaaS system, the iPaaS system being deployed on a first virtual private cloud (VPC) in a cloud network. The method further includes determining an address identifier of the service to be accessed by the iPaaS system, and a first transmission connection between the gateway and a data transmission circuitry associated with the service. The data transmission circuitry is connected to an Intranet, and the service is deployed in the Intranet or in a second VPC. The method further includes transmitting the data transmission request and the address identifier of the service from the gateway to (Continued)

the data transmission circuitry through the first transmission connection, where the data transmission circuitry transmits the data transmission request of the iPaaS system to the service.

14 Claims, 15 Drawing Sheets

(51) Int. Cl.
*H04L 67/63* (2022.01)
*H04L 67/56* (2022.01)

(56) References Cited

U.S. PATENT DOCUMENTS

| | | | | |
|---|---|---|---|---|
| 11,470,182 | B1* | 10/2022 | Virtser | H04L 67/56 |
| 2015/0312274 | A1* | 10/2015 | Bishop | H04L 63/20 |
| | | | | 726/1 |
| 2020/0351235 | A1* | 11/2020 | Shang | H04L 67/563 |
| 2023/0004447 | A1* | 1/2023 | Seth | G06F 9/5077 |
| 2023/0078546 | A1* | 3/2023 | Sun | H04L 67/10 |
| | | | | 709/223 |

FOREIGN PATENT DOCUMENTS

| | | |
|---|---|---|
| CN | 11030912 A | 4/2020 |
| CN | 112243036 A | 1/2021 |
| CN | 112738284 A | 4/2021 |

OTHER PUBLICATIONS

International Search Report and Written Opinion in PCT/CN2022/082006, dated Jun. 17, 2022, 13 pages.

Shanghai IRE Marketing Consulting Co Ltd., "China Enterprise SaaS Industry Research Report," IRE Consulting Series Research Reports, Nov. 30, 2020, Issue 11.

\* cited by examiner

US 11,856,065 B2

DATA TRANSMISSION FOR SERVICE INTEGRATION BETWEEN A VIRTUAL PRIVATE CLOUD AND AN INTRANET

RELATED APPLICATIONS

This application is a continuation of International Application No. PCT/CN2022/082006, filed on Mar. 21, 2022, which claims priority to Chinese patent application No. 202110353970.X, filed on Apr. 1, 2021. The entire disclosures of the prior applications are hereby incorporated by reference.

FIELD OF THE TECHNOLOGY

This application relates to the field of cloud computing services, including a data transmission method, apparatus and device in service integration, a computer-readable storage medium, and a computer program product.

BACKGROUND OF THE DISCLOSURE

An integration platform as a service (iPaaS) integration application is an application developed to integrate different systems and services according to certain logic. In the related art, many internal systems, databases and software-as-a-service (SaaS) systems of a target client are deployed in a client Intranet, while an iPaaS system is usually deployed on a virtual private cloud (VPC) on a public cloud. Thus, the iPaaS system cannot be directly connected to private services and databases of the client Intranet, so that the integrated logic of the private services and databases of the Intranet cannot be completed. Furthermore, since cross-region VPCs cannot be directly connected through the client Intranet, systems and databases to be integrated that are partially deployed on different VPCs cannot be integrated through the iPaaS systems deployed on the VPCs.

It can be seen that an iPaaS service integration scheme in the related art, limited by network inaccessibility, cannot satisfy the service integration requirements well.

SUMMARY

Embodiments of this disclosure provide a data transmission method, apparatus and device in service integration, a computer-readable storage medium, and a computer program product, which can realize the network intercommunication between an iPaaS system and a tenant Intranet, and realize integration logic of services in the Intranet, thus realizing the integration logic of services in different Intranets or different VPCs of the same tenant, so as to perfect the service integration capability of the iPaaS system.

In an embodiment, a data transmission method for service integration includes receiving, by a gateway of an integration platform as a service (iPaaS) system, a data transmission request transmitted by the iPaaS system. The iPaaS system is deployed on a first virtual private cloud (VPC) in a cloud network, and the data transmission request includes a request from the iPaaS system to access a service. The method further includes determining, based on service configuration information, an address identifier of the service to be accessed by the iPaaS system, and a first transmission connection between the gateway and a data transmission circuitry associated with the service. The data transmission circuitry is connected to an Intranet, the service is deployed in the Intranet or in a second VPC, and the first transmission connection is established based on a first connection establishment request initiated by the data transmission circuitry. The address identifier of the service includes at least one of an IP address or a port number. The method further includes transmitting the data transmission request and the address identifier of the service from the gateway to the data transmission circuitry through the first transmission connection. The data transmission circuitry transmits, based on the address identifier, the data transmission request of the iPaaS system to the service.

In an embodiment, a data transmission method for service integration includes receiving, by data transmission circuitry, a data transmission request of an integration platform as a service (iPaaS) system and an address identifier of a service to be accessed by the iPaaS system. The data transmission request is transmitted by a gateway of the iPaaS system, the iPaaS system is deployed on a first virtual private cloud (VPC) in a cloud network, the data transmission circuitry is deployed in an Intranet, and the service is deployed in the Intranet or a second VPC. The address identifier of the service comprising at least one of an IP address or a port number. The method further includes transmitting, based on the address identifier, the data transmission request of the iPaaS system to the service, and determining, in response to receiving response data transmitted by the service, a first transmission connection between the data transmission circuitry and the gateway based on the address identifier of the service. The first transmission connection is established based on a first connection establishment request initiated by the data transmission circuitry. The method further includes transmitting the response data of the service and the address identifier of the service to the gateway through the first transmission connection. The gateway transmits the response data of the service to requesting logic of the iPaaS system.

In an embodiment, a data transmission apparatus for service integration includes processing circuitry configured to receive, by a gateway of an integration platform as a service (iPaaS) system, a data transmission request transmitted by the iPaaS system. The iPaaS system is deployed on a first virtual private cloud (VPC) in a cloud network, and the data transmission request includes a request from the iPaaS system to access a service. The processing circuitry is further configured to determine, based on service configuration information, an address identifier of the service to be accessed by the iPaaS system, and a first transmission connection between the gateway and data transmission circuitry associated with the service. The data transmission circuitry is connected to an Intranet, the service is deployed in the Intranet or in a second VPC, and the first transmission connection is established based on a first connection establishment request initiated by the data transmission circuitry. The address identifier of the service includes at least one of an IP address or a port number. The processing circuitry is further configured to transmit the data transmission request and the address identifier of the service from the gateway to the data transmission circuitry through the first transmission connection. The data transmission circuitry transmits, based on the address identifier, the data transmission request of the iPaaS system to the service.

A data transmission request transmitted by a connector (requesting logic) of an iPaaS system is received by a gateway of the iPaaS system deployed on a first VPC, an address identifier of a target service of the data transmission request and a first transmission connection for data transmission between the gateway and an agent (data transmission circuitry) associated with the target service are determined, and the data transmission request and the address identifier of the target service are transmitted to the agent through the first transmission connection, whereby the agent transmits the data transmission request to the target service based on the address identifier. In this way, network intercommunication between the iPaaS system and a tenant Intranet can be realized, and the integration logic of services in the Intranet can be realized. In addition, the iPaaS system is deployed on the first VPC of the tenant, the target service is deployed on the Intranet or a second VPC of the tenant, and the data transmission request is transmitted to the agent of the target service through the first transmission connection, thus realizing the integration logic of services in different Intranets or different VPCs of the same tenant, so as to perfect the service integration capability of the iPaaS system.

RELATED ART

Figure 1A:
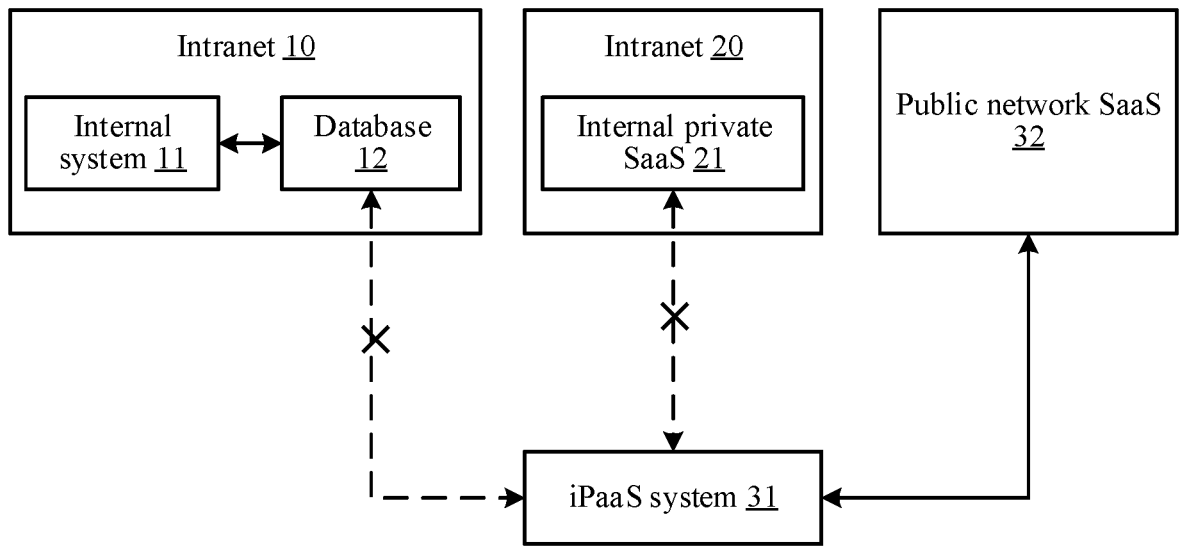
FIG. 1A is a schematic diagram of a scenario for deploying an iPaaS system in the related art.
Figure 1B:
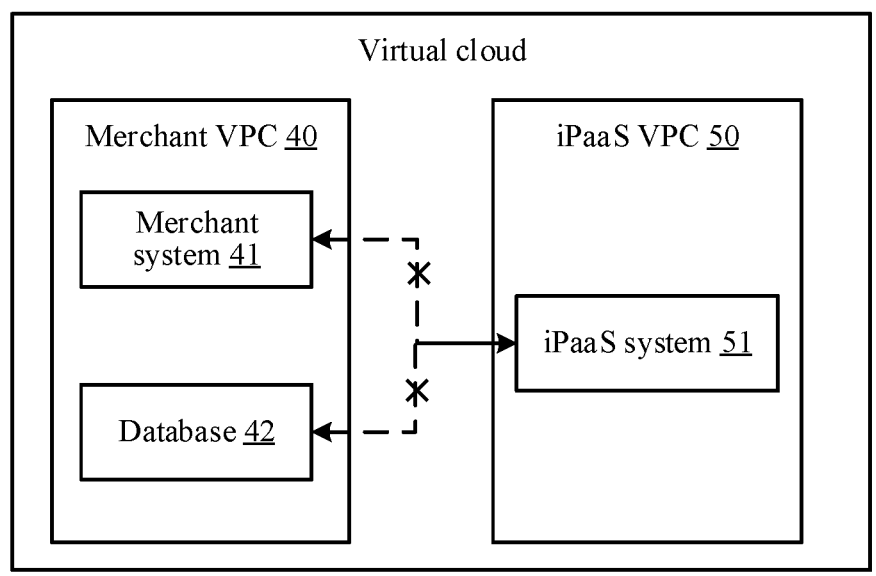
FIG. 1B is a schematic diagram of a scenario for deploying an iPaaS system in the related art.
Figure 1C:
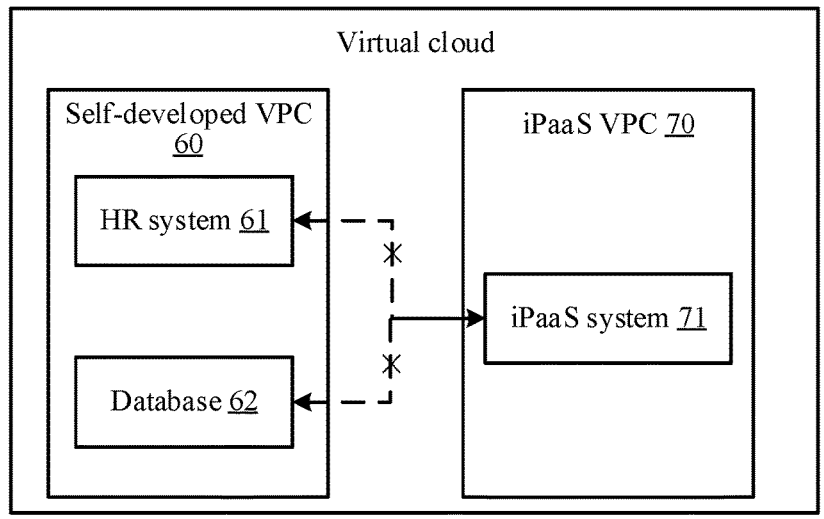
Figure 1D:
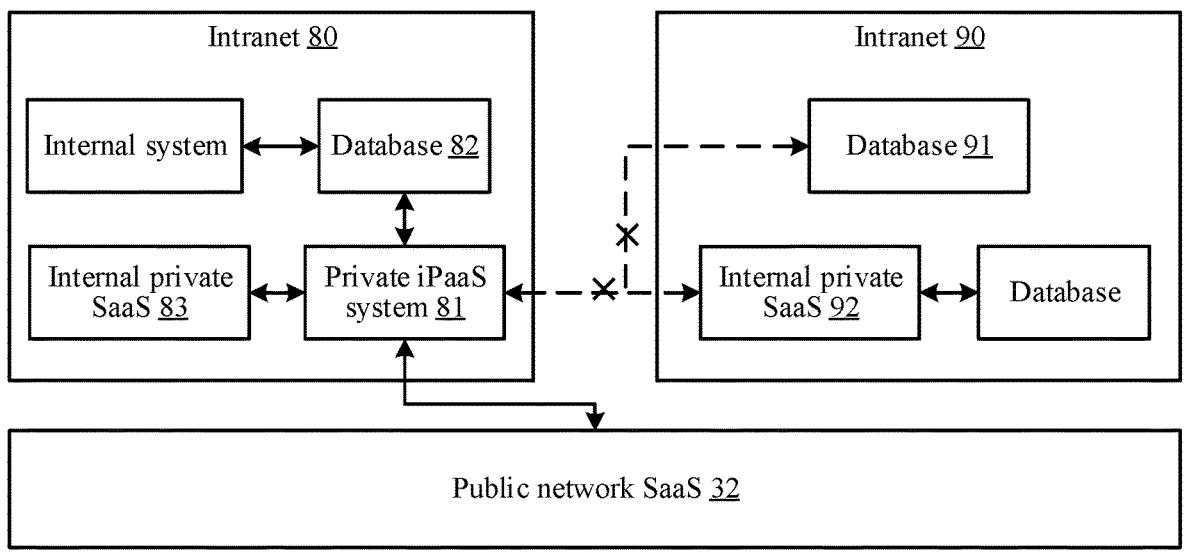

FIG. 1C is a schematic diagram of a scenario for deploying an iPaaS system in the FIG. 1D is a schematic architectural diagram of privatization deployment of an iPaaS system in the related art.

Figure 1E:
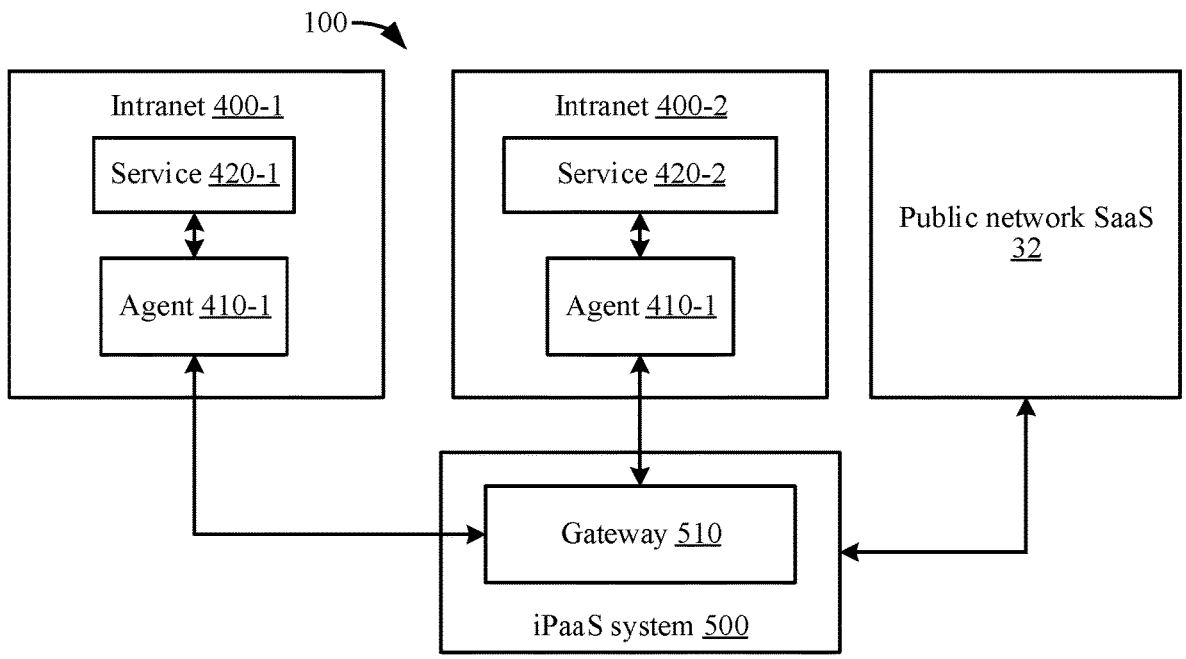

FIG. 1E is a schematic architectural diagram of an integration service system according to embodiments of this disclosure.

Figure 2A:
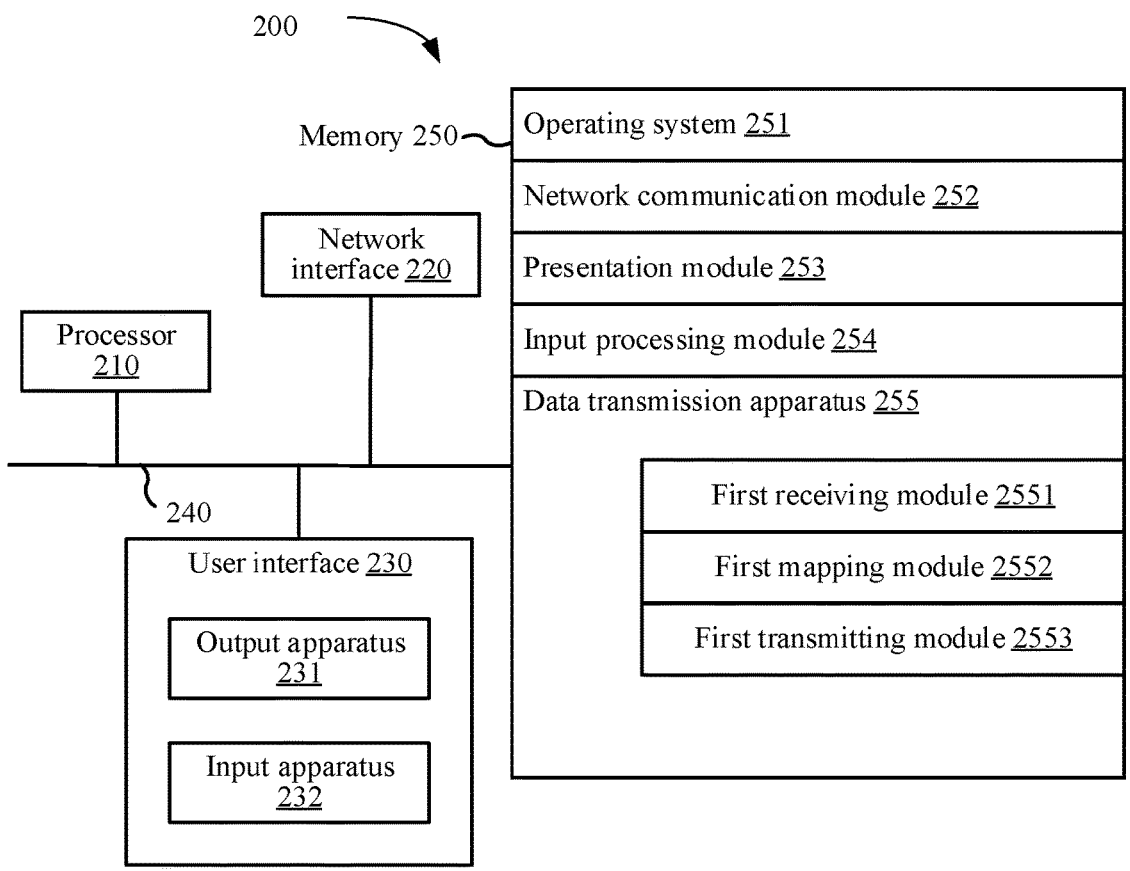

FIG. 2A is a schematic structural diagram of a data transmission device in service integration according to embodiments of this disclosure.

Figure 2B:
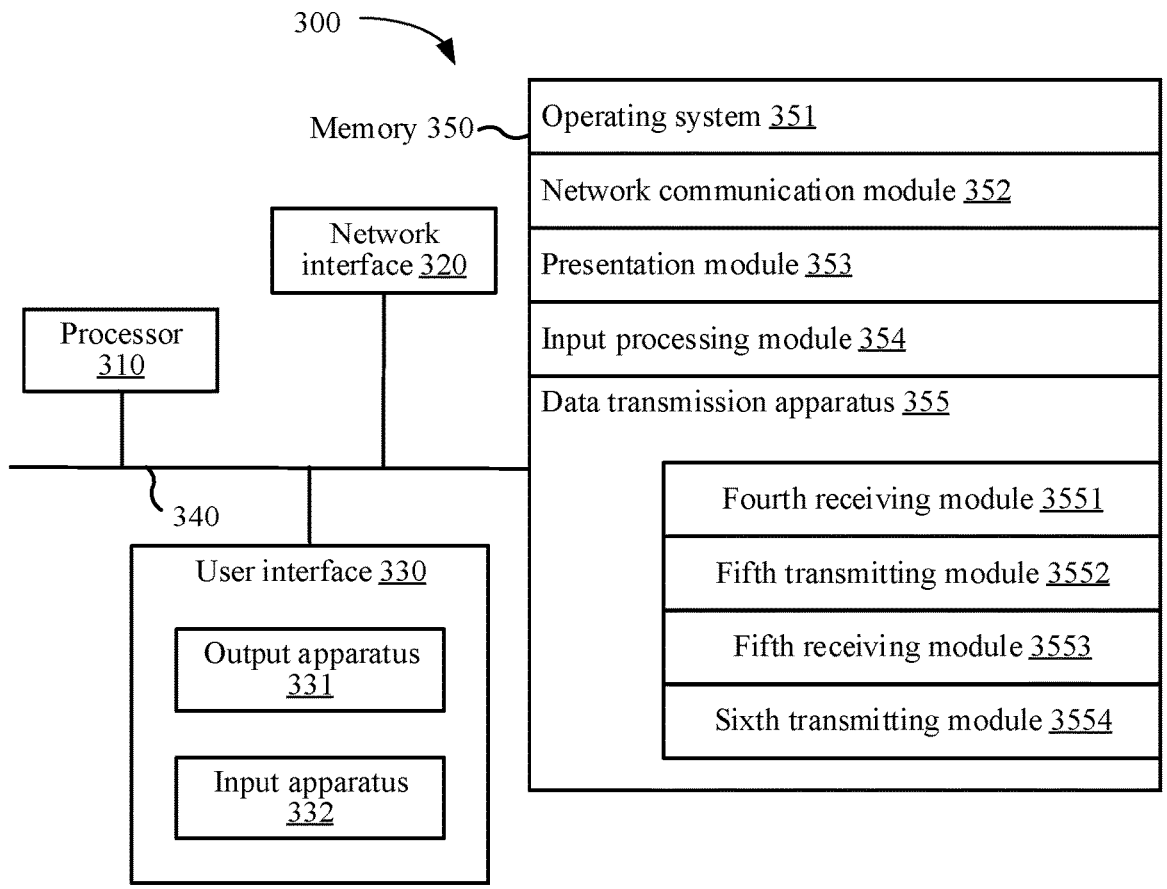

FIG. 2B is a schematic structural diagram of a data transmission device in service integration according to embodiments of this disclosure.

Figure 3:
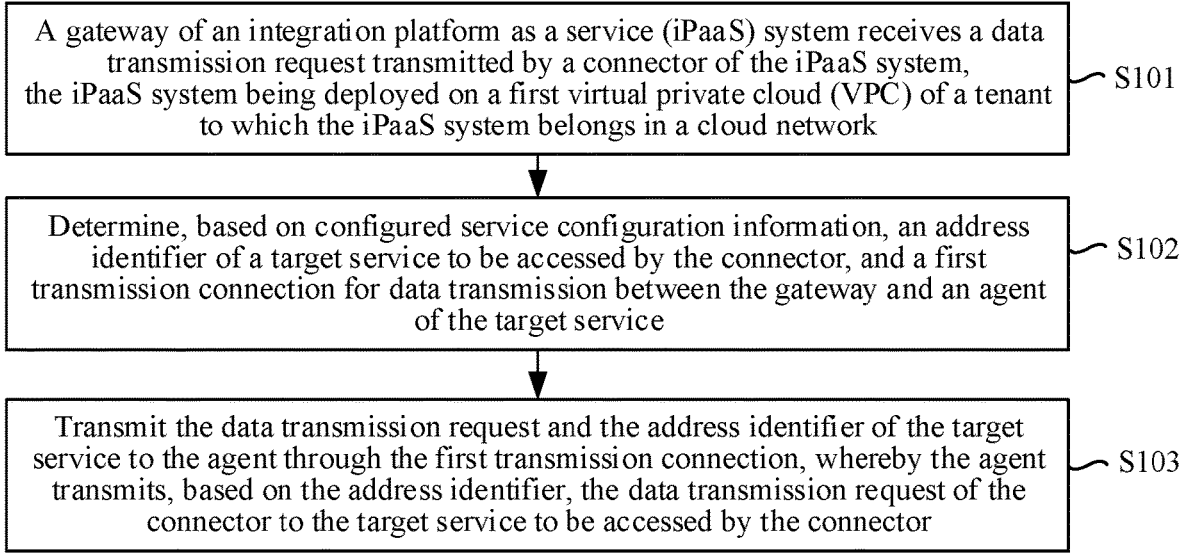

FIG. 3 is a schematic flowchart of a data transmission method in service integration according to embodiments of this disclosure.

Figure 4:
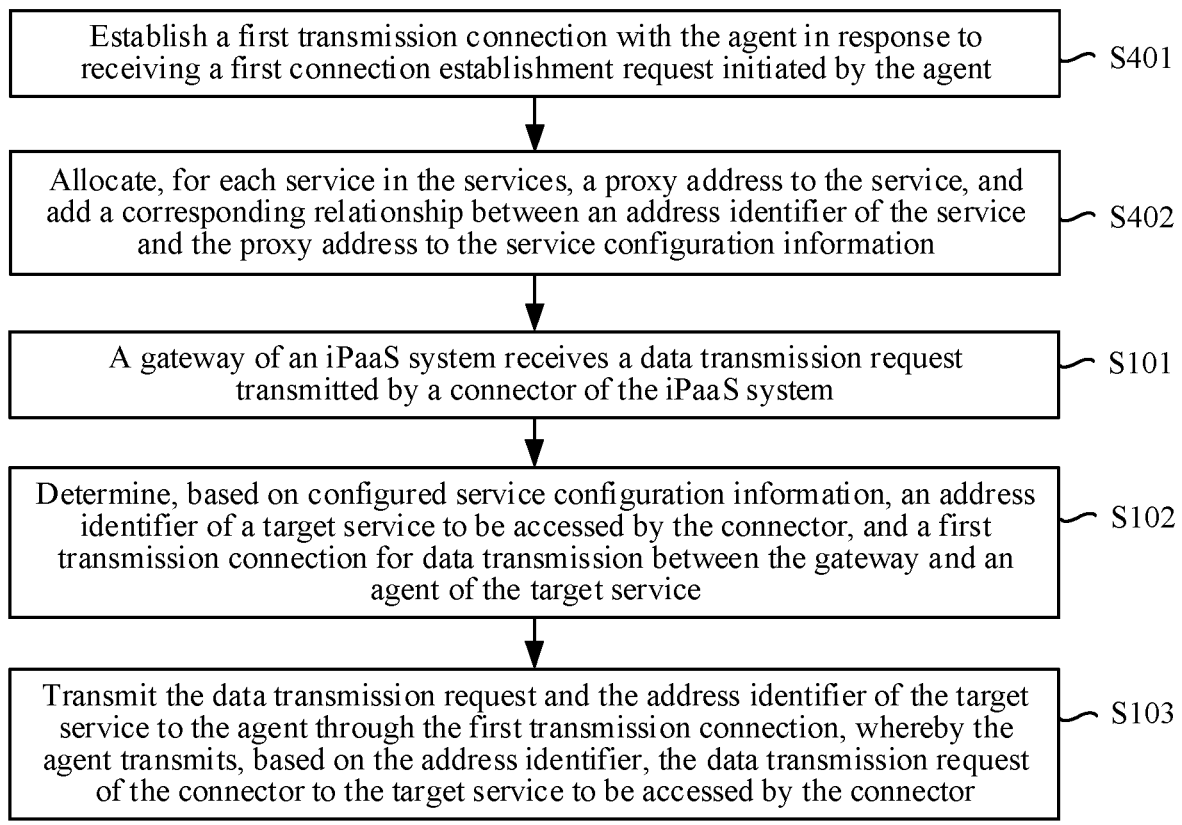

FIG. 4 is a schematic flowchart of a data transmission method in service integration according to embodiments of this disclosure.

Figure 5A:
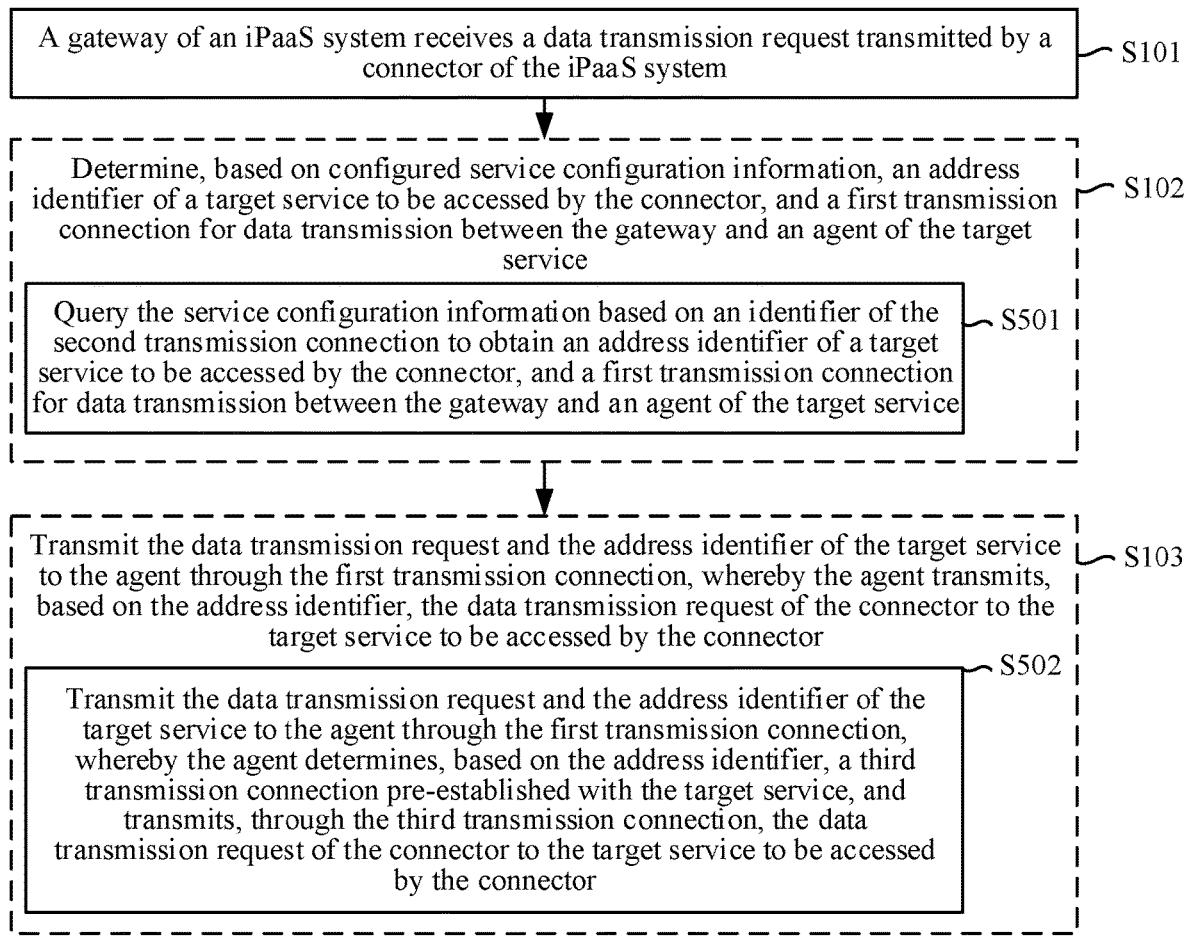

FIG. 5A is a schematic flowchart of a data transmission method in service integration according to embodiments of this disclosure.

Figure 5B:
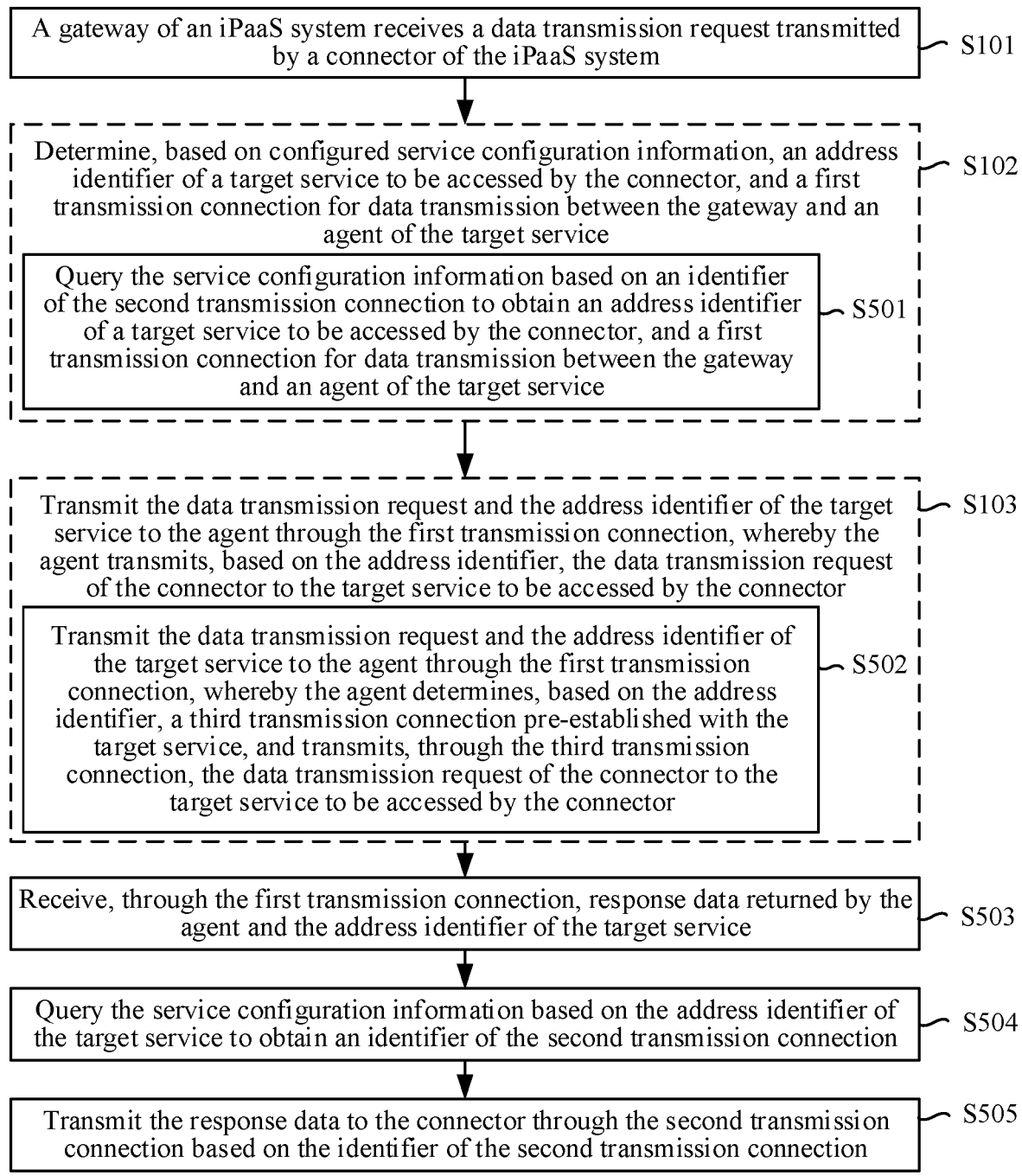

FIG. 5B is a schematic flowchart of a data transmission method in service integration according to embodiments of this disclosure.

Figure 5C:
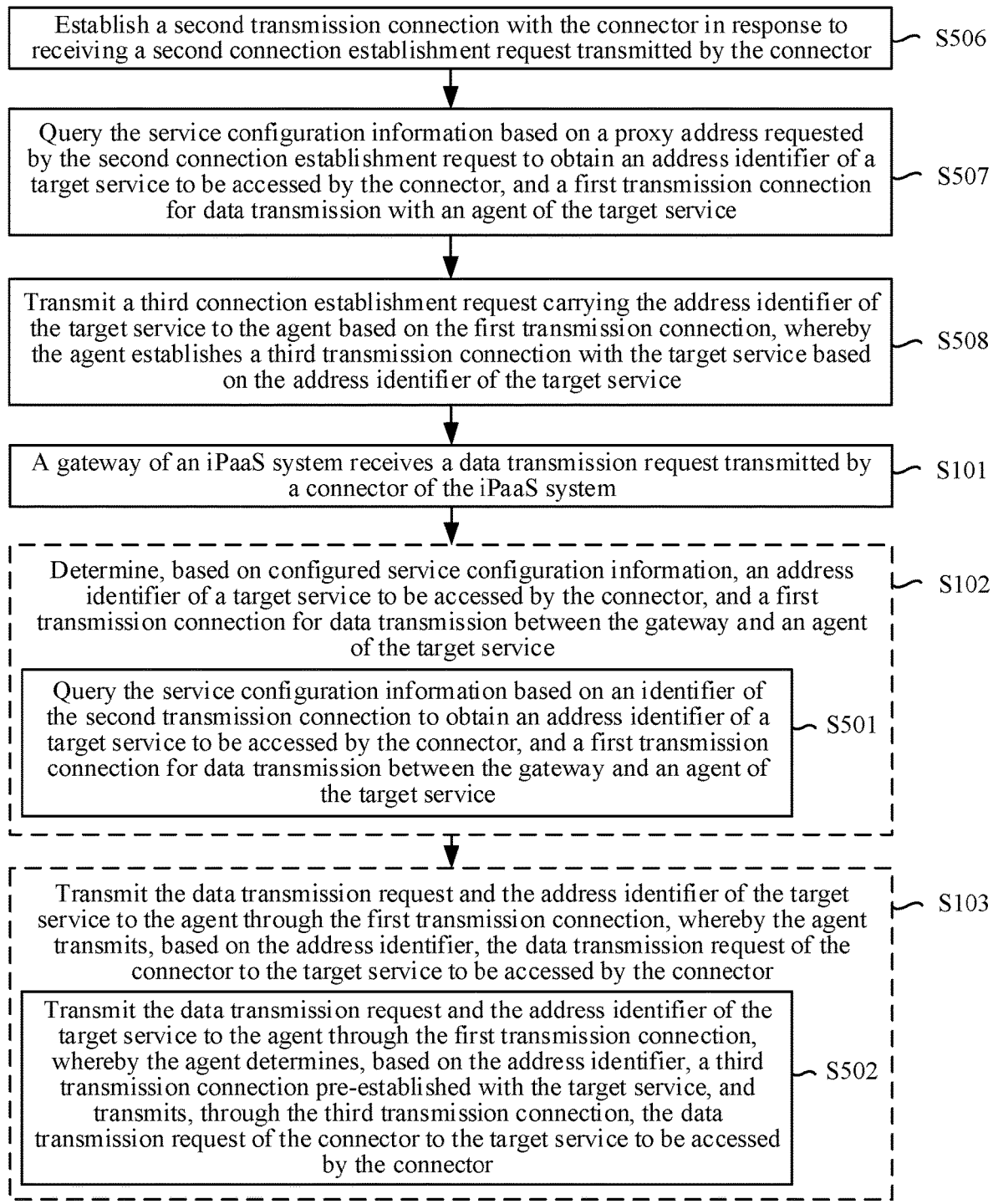

FIG. 5C is a schematic flowchart of a data transmission method in service integration according to embodiments of this disclosure.

Figure 6A:
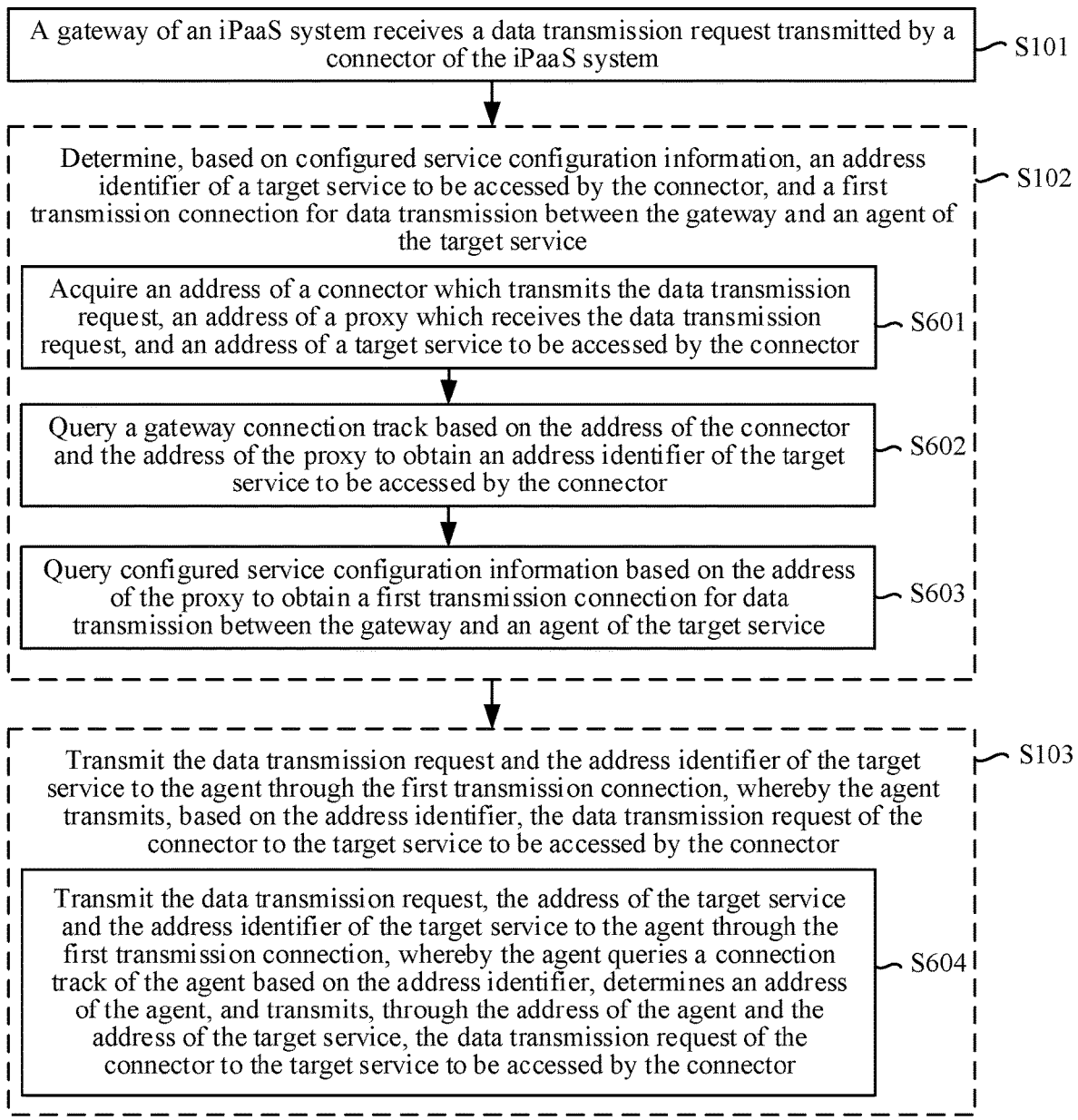

FIG. 6A is a schematic flowchart of a data transmission method in service integration according to embodiments of this disclosure.

Figure 6B:
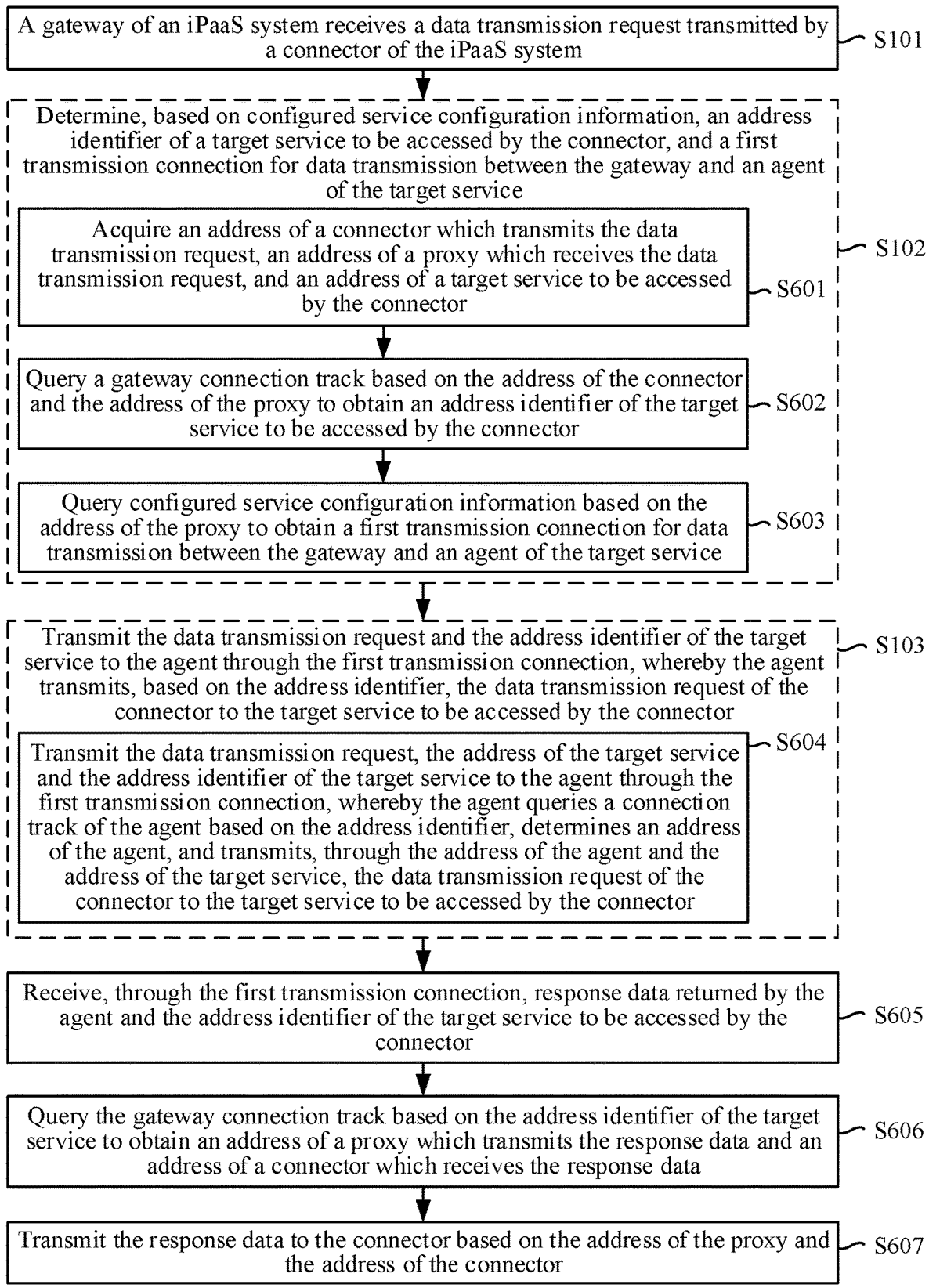

FIG. 6B is a schematic flowchart of a data transmission method in service integration according to embodiments of this disclosure.

Figure 7:
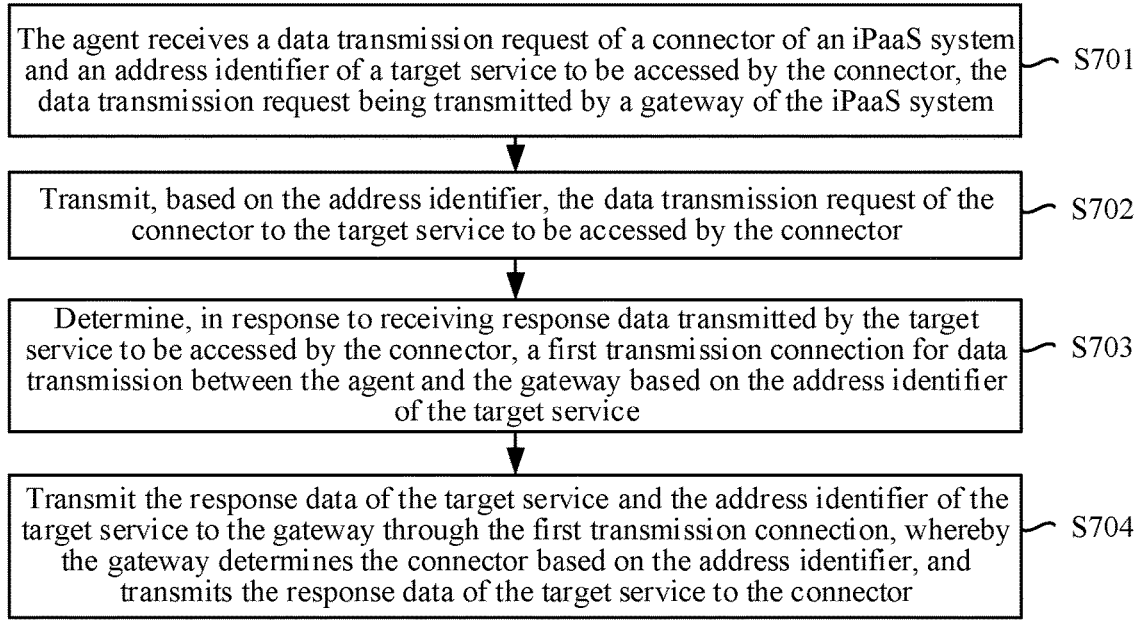

FIG. 7 is a schematic flowchart of a data transmission method in service integration according to embodiments of this disclosure.

Figure 8A:
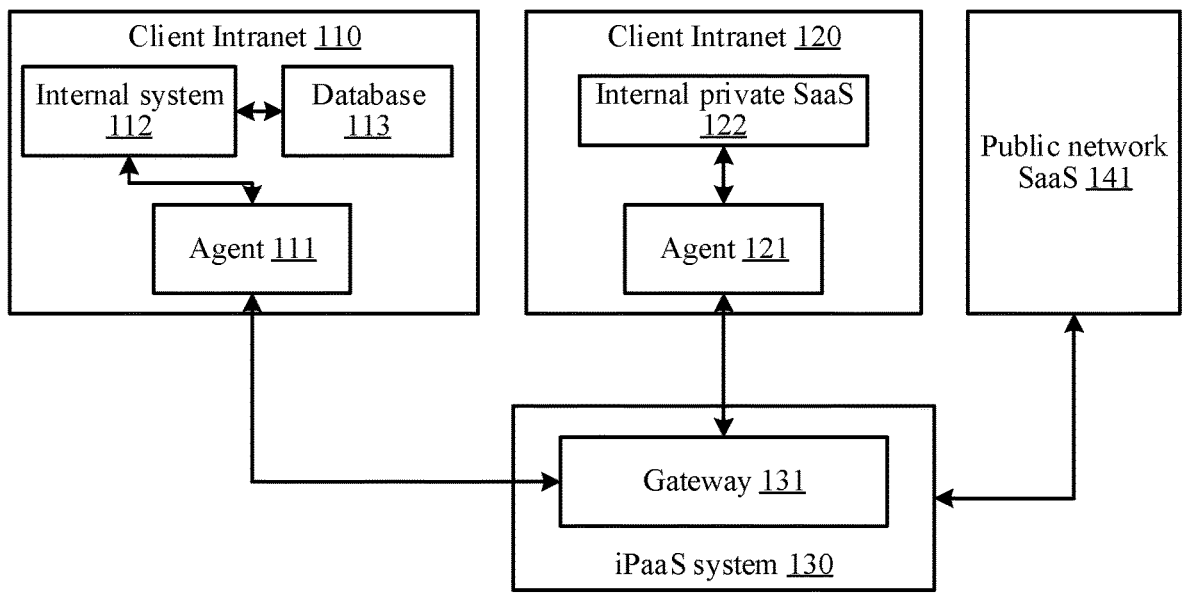

FIG. 8A is a schematic diagram of an implementation architecture of a service integration system according to embodiments of this disclosure.

Figure 8B:
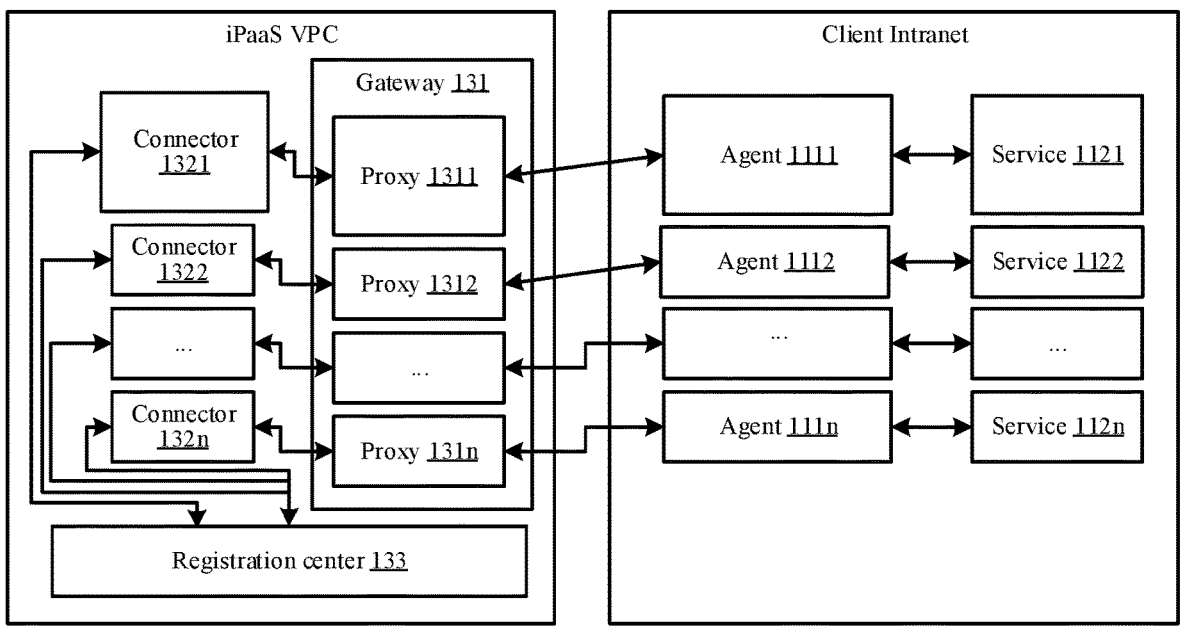

FIG. 8B is a schematic diagram of an implementation architecture of a service integration system according to embodiments of this disclosure.

Figure 8C:
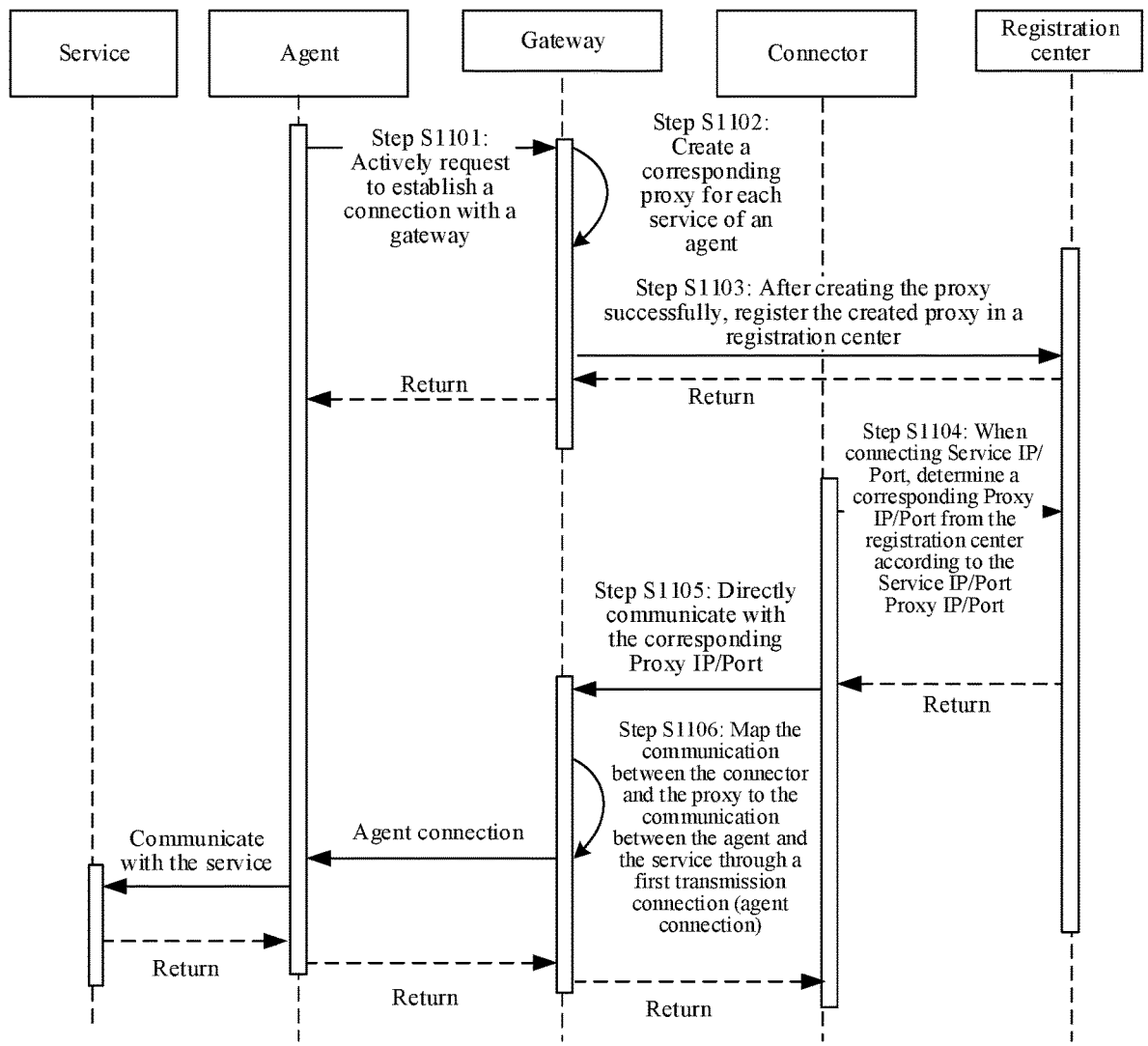

FIG. 8C is a schematic diagram of an interaction flow between various modules in a service integration system according to embodiments of this disclosure.

Figure 8D:
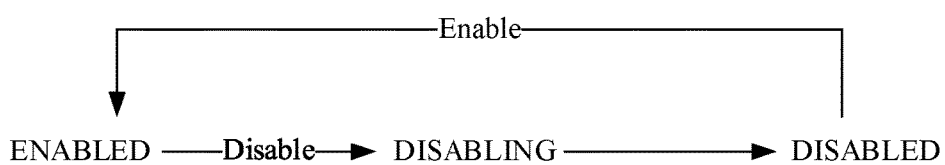

FIG. 8D is a schematic diagram of status transition of private cloud meta in a service integration system according to embodiments of this disclosure.

Figure 9:
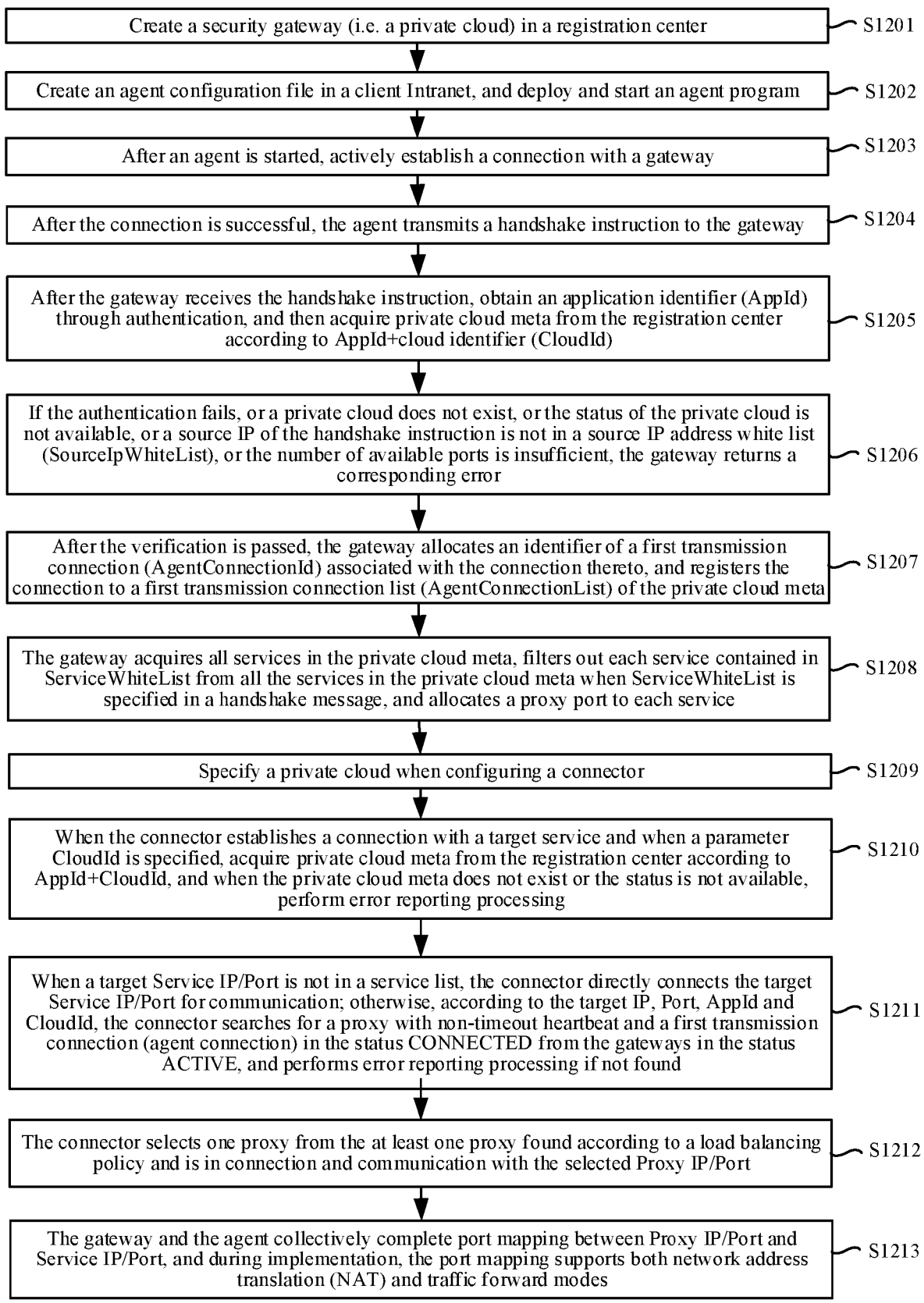

FIG. 9 is a schematic flowchart of a data transmission method in service integration according to embodiments of this disclosure.

Figure 10:
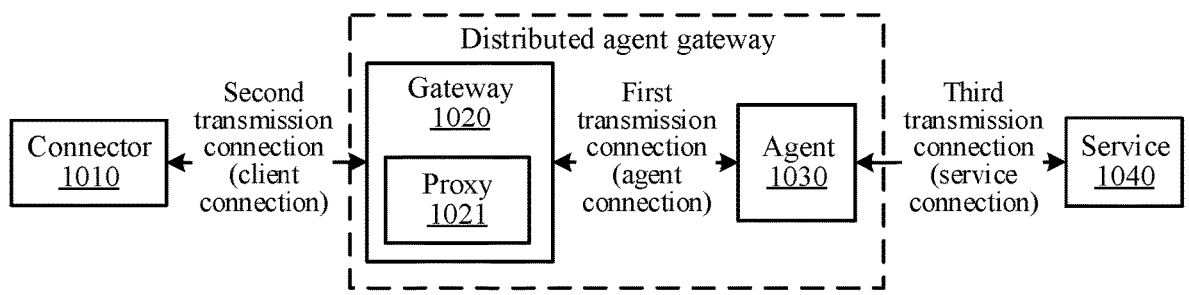

FIG. 10 is a schematic diagram of a composition architecture of a service integration system for port mapping using a traffic forward mode according to embodiments of this disclosure.

Figure 11:
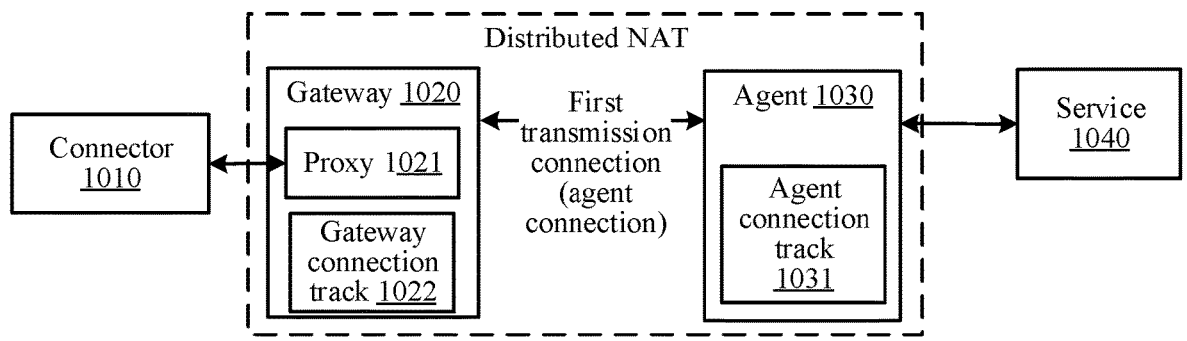

FIG. 11 is a schematic diagram of a composition architecture of a service integration system for port mapping using a network address translation (NAT) mode according to embodiments of this disclosure.

DESCRIPTION OF EMBODIMENTS

To make the objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art shall fall within the protection scope of this disclosure.

In the following descriptions, the term "some embodiments" describes a subset of all possible embodiments. However, it may be understood that "some embodiments" may be the same subset or different subsets of all the possible embodiments, and may be combined with each other without conflict.

If similar description of "first/second" appears in the disclosure document, the following description shall be added. In the following descriptions, the included term "first\second\third" is merely intended to distinguish similar objects but does not indicate a specific order of an object. It may be understood that "first\second\third" is interchangeable in terms of a specific order or sequence if permitted, so that the embodiments of this disclosure described herein can be implemented in a sequence in addition to the sequence shown or described herein.

Unless otherwise defined, meanings of all technical and scientific terms used in this specification are the same as that usually understood by a person skilled in the art to which this disclosure belongs. Terms used in this specification are merely intended to describe objectives of the embodiments of this disclosure, but are not intended to limit this disclosure.

In order to better understand a data transmission method in service integration according to the embodiments of this disclosure, a deployment scheme of an iPaaS system in the related art will be described below.

In the related art, the iPaaS system, limited in some scenarios, cannot meet integration requirements. For example, integration logic cannot be completed through the iPaaS system in the following scenarios:

1) Scenario 1:

Referring to FIG. 1A, in this scenario, an internal system 11 and a database 12 of a target tenant are deployed in an Intranet 10, an internal private SaaS 21 is deployed in the Intranet 20, and an iPaaS system 31 is deployed on a public cloud VPC. Without the assistance of any third-party tools such as an agent and a virtual private network (VPN), the iPaaS system 31 may be directly connected to a public network SaaS 32, but cannot be directly connected to the internal system 11 and the database 12 in the Intranet 10 and the internal private SaaS 21 in the Intranet 20, and thus cannot complete the integration logic of the internal system 11, the database 12 and the private SaaS 21.

2) Scenario 2:

Referring to FIG. 1B, in this scenario, a merchant system 41 and a database 42 are deployed on a merchant VPC 40 in a virtual cloud, and an iPaaS system 51 is deployed on an iPaaS VPC 50 in the virtual cloud. When the merchant VPC 40 and the iPaaS VPC 50 belong to different regions, since the cross-region VPCs cannot be directly connected through an Intranet, the merchant system 41 and the database 42 cannot be integrated by the iPaaS system 51 deployed on the iPaaS VPC 50. Similarly, referring to FIG. 1C, a home register (HR) system 61 and a database 62 are deployed on a self-developed VPC 60 in a virtual cloud, and an iPaaS system 71 is deployed on an iPaaS VPC 70 in the virtual cloud. When the self-developed VPC 60 and the iPaaS VPC 70 belong to different regions, the HR system 61 and the database 62 cannot be integrated by the iPaaS system 71 deployed on the iPaaS VPC 70.

It can be seen that in the above-mentioned scenarios, since the iPaaS system cannot intercommunicate with the Intranet of the tenant, and the iPaaS system cannot access services on the public cloud VPC or the self-developed VPC through an Intranet line, the application scenario of the iPaaS system in the related art is limited, and the requirements for service integration cannot be well met.

In view of the above-mentioned problems, referring to FIG. 1D, a manner of deploying a complete set of private iPaaS systems 81 in an Intranet 80 of a target tenant is adopted in the related art, a private iPaaS system 81 is used to connect a database 82 and an internal private SaaS 83 in the same Intranet, while the private iPaaS system 81 supports intercommunication with the public network SaaS 32, but the private iPaaS system 81 does not intercommunicate with a network between a database 91 and an internal private SaaS 92 deployed in another Intranet 90.

Therefore, the above-mentioned manner of privatization deployment of the iPaaS system in the related art does not completely solve the problem of Intranet intercommunication, and there are the following problems: 1) The integration of services in multiple non-intercommunicated Intranets or VPCs cannot be supported. If a tenant has more than one Intranet, a set of private iPaaS cannot satisfy the integration of services and databases among multiple non-intercommunicated Intranets. 2) The cost is high: multiple sets of private iPaaS systems are required to be deployed for multiple customers, and thus resource requirements are high. 3) The iteration update period is long, and at the time of each iteration update of the iPaaS system, all the private iPaaS systems deployed in the tenant Intranet need to be updated synchronously. 4) The maintenance is difficult, the resources and networks of different customers are different, and the operation and maintenance costs of the private iPaaS systems will be large.

Embodiments of this disclosure provide a data transmission method, apparatus and device in service integration, a computer-readable storage medium, and a computer program product. Network intercommunication between an iPaaS system and a tenant Intranet can be realized, and the integration logic of services in the Intranet can be realized. In addition, the iPaaS system is deployed on the first VPC of the tenant, the target service is deployed on the Intranet or a second VPC of the tenant, and the data transmission request is transmitted to the agent of the target service through the first transmission connection, thus realizing the integration logic of services in different Intranets or different VPCs of the same tenant, so as to perfect the service integration capability of the iPaaS system. Moreover, the development, maintenance and iteration costs of the iPaaS system can be effectively reduced. An exemplary application of the data transmission device in service integration according to embodiments of this disclosure is described below. The data transmission device in service integration according to the embodiments of this disclosure may be a gateway of an iPaaS system or may be an agent deployed in a tenant Intranet. When implemented, the gateway and the agent may both be implemented as various types of user terminals such as a notebook computer, a tablet computer, a desktop computer, an on-board navigator, a set-top box, a mobile device (e.g. a mobile phone, a portable music player, a personal digital assistant, a dedicated messaging device, or a portable game device), or implemented as a server. An exemplary application will be described below when both the gateway and the agent serving as the data transmission devices in service integration are implemented as servers.

Reference is made to FIG. 1E. FIG. 1E is a schematic architectural diagram of an integration service system 100 according to embodiments of this disclosure. Services in an Intranet may be integrated according to a certain logic. The integration service system 100 includes an agent (an agent 410-1 and an agent 410-2 are exemplarily shown) and a service (a service 420-1 and a service 420-2 are exemplarily shown) deployed in an Intranet of a tenant (an Intranet 400-1 and an Intranet 400-2 are exemplarily shown), an iPaaS system 500 deployed on a first VPC, and a gateway 510 of the iPaaS system 500. The agent and the gateway 510 may realize network intercommunication. The iPaaS system may perform data transmission intercommunication with the corresponding service through the gateway 510 and the agent, while the iPaaS system 500 also supports intercommunication with the public network SaaS 32.

The gateway 510 is configured to: receive a data transmission request transmitted by a connector of the iPaaS system, the iPaaS system being deployed on a first VPC of a tenant to which the iPaaS system belongs in a cloud network; determine, based on configured service configuration information, an address identifier of a target service to be accessed by the connector, and a first transmission connection for data transmission between the gateway and an agent of the target service, the agent being deployed in an Intranet of the tenant, the target service being deployed in the Intranet or a second VPC of the tenant, and the first transmission connection being established based on a first connection establishment request initiated by the agent; and transmit the data transmission request and the address identifier of the target service to the agent through the first transmission connection, whereby the agent transmits, based on the address identifier, the data transmission request of the connector to the target service to be accessed by the connector.

The agent is configured to: receive a data transmission request of a connector of an iPaaS system and an address identifier of a target service to be accessed by the connector, the data transmission request being transmitted by a gateway of the iPaaS system, the iPaaS system being deployed on a first VPC of a tenant to which the iPaaS system belongs in a cloud network, the agent being deployed in an Intranet of the tenant, and the target service being deployed in the Intranet or a second VPC of the tenant; transmit, based on the address identifier, the data transmission request of the connector to the target service to be accessed by the connector; determine, in a case of receiving response data transmitted by the target service to be accessed by the connector, a first transmission connection for data transmission between the agent and the gateway based on the address identifier of the target service, the first transmission connection being established based on a first connection establishment request initiated by the agent; and transmit the response data of the target service and the address identifier of the target service to the gateway through the first transmission connection, whereby the gateway determines the connector based on the address identifier, and transmits the response data of the target service to the connector.

In some embodiments, the gateway 510 and the agent may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The gateway and the agent may be directly or indirectly connected in a wired or wireless communication manner. This is not limited in the embodiments of this disclosure.

In some embodiments, both the gateway 510 and the agent may also be nodes in a blockchain system. The blockchain system may be a distributed node formed by multiple nodes (any form of computing devices in an access network, such as a server and a user terminal) and a client. A peer-to-peer (P2P) network is formed between the nodes, and a P2P protocol is an application layer protocol running on top of a transmission control protocol (TCP). In the blockchain system, any machine such as a server or a terminal may be added to form a node.

Reference is made to FIG. 2A. FIG. 2A is a schematic structural diagram of a data transmission device 200 in service integration according to embodiments of this disclosure. For example, the data transmission device 200 in service integration is implemented as a gateway. The data transmission device 200 in service integration shown in FIG. 2A includes: at least one processor 210 (including processing circuitry), a memory 250 (including a non-transitory computer-readable storage medium), at least one network interface 220, and a user interface 230. Various components in the data transmission device 200 in service integration are coupled together through a bus system 240. It may be understood that the bus system 240 is configured to implement connection and communication between the components. In addition to a data bus, the bus system 240 further includes a power bus, a control bus, and a status signal bus. However, for clear description, various buses are all labeled as the bus system 240 in FIG. 2A.

The processor 210 may be an integrated circuit chip having a signal processing capability, such as a general purpose processor, a digital signal processor (DSP), or another programmable logic device (PLD), discrete gate, transistor logical device, or discrete hardware component. The general purpose processor may be a microprocessor, any conventional processor, or the like.

The user interface 230 includes one or more output apparatuses 231 that can display media content, including one or more loudspeakers and/or one or more visual display screens. The user interface 230 further includes one or more input apparatuses 232, including user interface components that facilitate inputting of a user, such as a keyboard, a mouse, a microphone, a touch display screen, a camera, and other input button and control.

The memory 250 may be a removable memory, a non-removable memory, or a combination thereof. Exemplary hardware devices include a solid-state memory, a hard disk drive, an optical disc driver, or the like The memory 250 may include one or more storage devices physically away from the processor 210.

The memory 250 includes a volatile memory or a non-volatile memory, or may include both a volatile memory and a non-volatile memory. The non-volatile memory may be a read-only memory (ROM). The volatile memory may be a random access memory (RAM). The memory 250 described in the embodiment of this disclosure aims to include any suitable type of memories.

In some embodiments, the memory 250 may store data to support various operations. Examples of the data include a program, a module, and a data structure, or a subset or a superset thereof, which are described below by using examples.

An operating system 251 includes a system program configured to process various basic system services and perform a hardware-related task, such as a framework layer, a core library layer, or a driver layer, and is configured to implement various basic services and process a hardware-based task.

A network communication module 252 is configured to reach another computing device through one or more (wired or wireless) network interfaces 220. Exemplary network interfaces 220 include: Bluetooth, wireless compatible authentication (Wi-Fi), a universal serial bus (USB), and the like.

A presentation module 253 is configured to present information (for example, a user interface for operating peripherals and displaying content and information) via one or more output apparatuses 231 (for example, a display screen, a speaker, etc.) associated with the user interface 230.

An input processing module 254 is configured to detect one or more user inputs or interactions from one of the one or more input apparatuses 232 and translate the detected input or interaction.

In some embodiments, the data transmission apparatus in service integration according to the embodiments of this disclosure may be implemented in the form of software. FIG. 2A shows a data transmission apparatus 255 in service integration stored in the memory 250, which may be software in the form of a program and a plug-in, etc., and includes the following software modules: a first receiving module 2551, a first mapping module 2552 and a first transmitting module 2553. These modules are logical, and therefore may be randomly combined or further split according to the functions realized. The following describes functions of the modules.

In other embodiments, the data transmission apparatus in service integration according to the embodiments of this disclosure may also be implemented in a hardware manner. As an example, the data transmission apparatus in service integration according to the embodiments of this disclosure may be a processor in the form of a hardware decoding processor which is programmed to perform a road matching method according to embodiments of this disclosure. For example, the processor in the form of a hardware decoding processor may use one or more application specific integrated circuits (ASICs), digital signal processors (DSPs), programmable logic devices (PLDs), complex programmable logic devices (CPLDs), field programmable gate arrays (FPGAs), or other electronic elements.

Reference is made to FIG. 2B. FIG. 2B is a schematic structural diagram of a data transmission device 300 in service integration according to embodiments of this disclosure. For example, the data transmission device in service integration is implemented as an agent. The data transmission device 300 in service integration shown in FIG. 2B includes: at least one processor 310, a memory 350, at least one network interface 320, and a user interface 330. Various components in the data transmission device 300 in service integration are coupled together through a bus system 340. It may be understood that the bus system 340 is configured to implement connection and communication between the components. In addition to a data bus, the bus system 340 further includes a power bus, a control bus, and a status signal bus. However, for clear description, various buses are all labeled as the bus system 340 in FIG. 2B.

The processor 310 may be an integrated circuit chip having a signal processing capability, such as a general purpose processor, a DSP, or another programmable logic device (PLD), discrete gate, transistor logical device, or discrete hardware component. The general purpose processor may be a microprocessor, any conventional processor, or the like.

The user interface 330 includes one or more output apparatuses 331 that can display media content, including one or more loudspeakers and/or one or more visual display screens. The user interface 330 further includes one or more input apparatuses 332, including user interface components that facilitate inputting of a user, such as a keyboard, a mouse, a microphone, a touch display screen, a camera, and other input button and control.

The memory 350 may be a removable memory, a non-removable memory, or a combination thereof. Exemplary hardware devices include a solid-state memory, a hard disk drive, an optical disc driver, or the like. The memory 350 may include one or more storage devices physically away from the processor 310.

The memory 350 includes a volatile memory or a non-volatile memory, or may include both a volatile memory and a non-volatile memory. The non-volatile memory may be a ROM. The volatile memory may be a RAM. The memory 350 described in the embodiment of this disclosure aims to include any suitable type of memories.

In some embodiments, the memory 350 may store data to support various operations. Examples of the data include a program, a module, and a data structure, or a subset or a superset thereof, which are described below by using examples.

An operating system 351 includes a system program configured to process various basic system services and perform a hardware-related task, such as a framework layer, a core library layer, or a driver layer, and is configured to implement various basic services and process a hardware-based task.

A network communication module 352 is configured to reach another computing device through one or more (wired or wireless) network interfaces 320. Exemplary network interfaces 320 include: Bluetooth, WiFi, a USB, and the like.

A presentation module 353 is configured to present information (for example, a user interface for operating peripherals and displaying content and information) via one or more output apparatuses 331 (for example, a display screen, a speaker, etc.) associated with the user interface 330.

An input processing module 354 is configured to detect one or more user inputs or interactions from one of the one or more input apparatuses 332 and translate the detected input or interaction.

In some embodiments, a data transmission apparatus in service integration according to the embodiments of this disclosure may be implemented in the form of software. FIG. 2B shows a data transmission apparatus 355 in service integration stored in the memory 350, which may be software in the form of a program and a plug-in, etc., and includes the following software modules: a fourth receiving module 3551, a fifth transmitting module 3552, a fifth receiving module 3553, and a sixth transmitting module 3554. These modules are logical, and therefore may be randomly combined or further split according to the functions realized. The following describes functions of the modules.

In other embodiments, the data transmission apparatus in service integration according to the embodiments of this disclosure may also be implemented in a hardware manner. As an example, the data transmission apparatus in service integration according to the embodiments of this disclosure may be a processor in the form of a hardware decoding processor which is programmed to perform a road matching method according to embodiments of this disclosure. For example, the processor in the form of a hardware decoding processor may use one or more ASICs, DSPs, PLDs, CPLDs, FPGAs, or other electronic elements.

The data transmission method in service integration according to the embodiments of this disclosure will be described below in combination with exemplary applications and implementations of the gateway according to the embodiments of this disclosure.

Reference is made to FIG. 3. FIG. 3 is a schematic flowchart of a data transmission method in service integration according to embodiments of this disclosure. The description will be made below in conjunction with the steps shown in FIG. 3, and the execution body of the following steps may be the gateway described above.

In step S101, a gateway of an iPaaS system receives a data transmission request transmitted by a connector of the iPaaS system. In an embodiment, the data transmission request may be transmitted by one or more components of the iPaaS system or by the iPaaS system as a whole. The iPaaS system is deployed on a first VPC of a tenant to which the iPaaS system belongs in a cloud network. For example, a data transmission request transmitted by the iPaaS system is received by a gateway of an iPaaS system, the iPaaS system being deployed on a first virtual private cloud (VPC) in a cloud network. The data transmission request includes a request from the iPaaS system to access a service.

Here, the first VPC may be any suitable VPC on a public cloud that may deploy the iPaaS system. The connector of the iPaaS system needs to realize the integration logic of a service by connecting corresponding service. The data transmission request is a request from a connector to acquire data from a target service.

In step S102, an address identifier of a target service to be accessed by the connector and a first transmission connection for data transmission between the gateway and an agent of the target service are determined based on configured service configuration information. The agent is deployed in an Intranet of the tenant, the target service is deployed in the Intranet or a second VPC of the tenant, and the first transmission connection is established based on a first connection establishment request initiated by the agent. For example, an address identifier of the service to be accessed by the iPaaS system and a first transmission connection between the gateway and a data transmission circuitry associated with the service are determined based on service configuration information. The data transmission circuitry is connected to an Intranet, the service is deployed in the Intranet or in a second VPC, and the first transmission connection is established based on a first connection establishment request initiated by the data transmission circuitry. The address identifier of the service includes at least one of an IP address or a port number.

Here, the target service to be accessed by the connector is a service to be eventually accessed by the connector by transmitting the data transmission request, and the agent of the target service is an agent server for assisting the gateway in data transmission with the target service. The address identifier of the target service is identification information, which may uniquely determine an address of the target service, may be a combination of an Internet protocol (IP) address and port of the target service, and may also be a unique identifier generated based on the IP address and port of the target service. This is not limited herein. The first transmission connection is established in advance or in real time based on a first connection establishment request initiated by the agent, which may be a TCP connection or may be a remote procedure call (RPC) connection.

The service configuration information may be configuration information required for performing address mapping on an address of a connector and an address of a target server. The service configuration information may be preconfigured, and may include, but is not limited to, information characterizing a corresponding relationship between an address of a connector and an address of a target service, information characterizing a corresponding relationship between an address of a proxy which receives a data transmission request in a gateway and an address of a target service, information characterizing a corresponding relationship between an address combination of a connector and a proxy and an address combination of a target service and an agent of the target service, etc., and may also include, but is not limited to, information characterizing a corresponding relationship between an address of a connector and a first transmission connection, information characterizing a corresponding relationship between an address of a proxy which receives a data transmission request in a gateway and a first transmission connection, etc. During implementation, suitable service configuration information may be adopted according to actual situations. This is not limited herein.

For example, the service configuration information may include a mapping relationship between an address of a connector and an address identifier of a target service as well as a first transmission connection. When performing address mapping processing on a data transmission request, the service configuration information may be queried according to an address of a connector which transmits the data transmission request so as to obtain an address identifier of a target service and a first transmission connection corresponding to the address of the connector. For another example, the service configuration information may include a mapping relationship between an address of a proxy which receives a data transmission request in a gateway and an address identifier of a target service as well as a first transmission connection. When performing address mapping processing on a data transmission request, the service configuration information may be queried according to an address of a proxy which receives the data transmission request so as to obtain an address identifier of a target service and a first transmission connection corresponding to the address of the proxy.

An agent of a target service is deployed in an Intranet of a tenant, and the target service may be deployed in the Intranet or may be deployed in a second VPC of the tenant. In this way, the gateway may perform network intercommunication with a service in the Intranet through the agent in the Intranet or may perform network intercommunication with a service in the second VPC through the agent in the Intranet.

In step S103, the data transmission request and the address identifier of the target service are transmitted to the agent through the first transmission connection, whereby the agent transmits, based on the address identifier, the data transmission request of the connector to the target service to be accessed by the connector. For example, the data transmission request and the address identifier of the service is transmitted from the gateway to the data transmission circuitry through the first transmission connection. The data transmission circuitry then transmits, based on the address identifier, the data transmission request of the iPaaS system to the service.

Here, the gateway may transmit the data transmission request and the address identifier of the target service to the agent of the target service through the first transmission connection, and the agent may determine an IP address and port of the target service based on the address identifier of the target service, and transmit the data transmission request to the target service based on the determined IP address and port.

In the embodiments of this disclosure, a data transmission request transmitted by a connector of an iPaaS system is received by a gateway of the iPaaS system deployed on a first VPC, and an address identifier of a target service to be accessed by the connector and a first transmission connection for data transmission between the gateway and an agent of the target service are determined based on configured service configuration information. The agent is deployed in an Intranet of a tenant, the target service is deployed in the Intranet or a second VPC, and the first transmission connection is established based on a first connection establishment request initiated by the agent. The data transmission request and the address identifier of the target service are transmitted to the agent through the first transmission connection, whereby the agent transmits the data transmission request to the target service based on the address identifier. In this way, network intercommunication between the iPaaS system and a tenant Intranet can be realized, and the integration logic of services in the Intranet can be realized. In addition, the iPaaS system is deployed on the first VPC of the tenant, the target service is deployed on the Intranet or a second VPC of the tenant, and the data transmission request is transmitted to the agent of the target service through the first transmission connection, thus realizing the integration logic of services in different Intranets or different VPCs of the same tenant, so as to perfect the service integration capability of the iPaaS system. Moreover, the development, maintenance and iteration costs of the iPaaS system can be effectively reduced.

In some embodiments, reference is made to FIG. 4. FIG. 4 is a schematic flowchart of a data transmission method in service integration according to embodiments of this disclosure. Based on FIG. 3, the following steps S401 to S402 may also be performed before step S101. The description will be made below in conjunction with the steps, and the execution body of the following steps may be the gateway described above.

In step S401, a first transmission connection is established with the agent in response to receiving a first connection establishment request initiated by the agent. The first connection establishment request includes services of the agent.

Here, the agent may actively initiate a network connection request to the gateway, and the gateway may establish a first transmission connection with the agent after receiving a first connection establishment request initiated by the agent. The services of the agent may include at least one service connectable to the agent.

In step S402, for each service in the services, a proxy address is allocated to the service, and a corresponding relationship between an address identifier of the service and the proxy address is added to the service configuration information.

Here, the proxy address is an address allocated by the gateway to each service in the services for forwarding a data packet corresponding to the service, may be a port for forwarding a data message, and may also include an IP address and port for forwarding the data message. During implementation, the gateway may select a port from currently available ports as the proxy address after establishing a connection with the agent.

The address identifier of a service may be an IP address and port of a service acquired from the services, or may be a unique identifier allocated by the gateway based on the IP address and port of the service. This is not limited herein.

The service configuration information may be stored and maintained by the gateway or by other systems or modules. For example, a registration center may be deployed in the first VPC for storing and maintaining the service configuration information.

In the embodiments of this disclosure, the agent may actively initiate a network connection request to the gateway, and after receiving a first connection establishment request initiated by the agent, the gateway may establish a first transmission connection with the agent, allocate a proxy address to each service in the services of the agent, and add a corresponding relationship between an address identifier of each service and a corresponding proxy address to service configuration information. In this way, the gateway may acquire the address identifier of the target service from the service configuration information based on a port of a proxy which receives the data transmission request when the connector transmits data to the target service.

In some embodiments, reference is made to FIG. 5A. FIG. 5A is a schematic flowchart of a data transmission method in service integration according to embodiments of this disclosure. Based on FIG. 3, the data transmission request is transmitted by the connector through a second transmission connection pre-established with the gateway, step S102 may be implemented by the following step S501, and step S103 may be implemented by the following step S502. The description will be made below in conjunction with the steps, and the execution body of the following steps may be the gateway described above.

In step S501, the service configuration information is queried based on an identifier of the second transmission connection to obtain an address identifier of a target service to be accessed by the connector, and a first transmission connection for data transmission between the gateway and an agent of the target service.

Here, the second transmission connection is a connection established in advance or in real time between the connector and the gateway, and the identifier of the second transmission connection is information characterizing a unique second transmission connection, which may be generated by the connector or the gateway when establishing the second transmission connection, or may be a combination of an IP address and port of the connector, or a combination of an IP address and port of the gateway connected to the connector. This is not limited herein.

The service configuration information may include a corresponding relationship between the identifier of the second transmission connection and the address identifier of the service as well as the first transmission connection, and may also include a corresponding relationship between the identifier of the second transmission connection and the address of the proxy, and a corresponding relationship between the address of the proxy and the address identifier of the service as well as the first transmission connection. This is not limited herein.

In step S502, the data transmission request and the address identifier of the target service are transmitted to the agent through the first transmission connection, whereby the agent determines, based on the address identifier, a third transmission connection established with the target service, and transmits, through the third transmission connection, the data transmission request of the connector to the target service to be accessed by the connector.

Here, the agent may establish a third transmission connection with the target service in advance or in real time. After receiving an address identifier of a target service transmitted by the gateway through the first transmission connection, the agent may determine a third transmission connection corresponding to the target service based on the address identifier.

In the embodiments of this disclosure, a second transmission connection may be established in advance between the connector and the gateway, a first transmission connection may be established between the gateway and the agent of the target service, a third transmission connection may be established between the agent of the target service and the target service, an address identifier of the target service and the first transmission connection may be determined based on an identifier of the second transmission connection, and the third transmission connection may be determined based on the address identifier of the target service. In this way, network intercommunication between the iPaaS system in the first VPC and the target service in the Intranet or the second VPC can be achieved simply and quickly based on a pre-established full link connection between the connector and the target service during data transmission.

In some embodiments, reference is made to FIG. 5B. FIG. 5B is a schematic flowchart of a data transmission method in service integration according to embodiments of this disclosure. Based on FIG. 5A, the method may further include the following steps S503 to step S505. The description will be made below in conjunction with the steps, and the execution body of the following steps may be the gateway described above.

In step S503, response data returned by the agent and the address identifier of the target service are received through the first transmission connection. The response data is transmitted to the agent by the target service through the third transmission connection.

Here, the response data may be a response data packet returned to the gateway through the agent.

In step S504, the service configuration information is queried based on the address identifier of the target service to obtain an identifier of the second transmission connection.

Here, the service configuration information may include information characterizing a corresponding relationship between the target service and the second transmission connection. By querying the corresponding relationship, an identifier of the second transmission connection corresponding to the address identifier of the target service may be determined.

In step S505, the response data is transmitted to the connector through the second transmission connection based on the identifier of the second transmission connection.

In the embodiments of this disclosure, the response data of the target service may be transmitted to the connector of the iPaaS system through the third transmission connection, the first transmission connection and the second transmission connection. In this way, network intercommunication between the target service and the connector of the iPaaS system can be achieved simply and quickly.

In some embodiments, reference is made to FIG. 5C. FIG. 5C is a schematic flowchart of a data transmission method in service integration according to embodiments of this disclosure. Based on FIG. 5A, the following steps S506 to S508 may also be performed before step S101. The description will be made below in conjunction with the steps, and the execution body of the following steps may be the gateway described above.

In step S506, a second transmission connection is established with the connector in response to receiving a second connection establishment request transmitted by the connector.

Here, the connector may actively transmit a second connection establishment request to the gateway so that the gateway may establish a second transmission connection with the connector. During implementation, the second transmission connection may be a TCP connection or an RPC connection. This is not limited herein.

In step S507, the service configuration information is queried based on a proxy address requested by the second connection establishment request to obtain an address identifier of a target service to be accessed by the connector, and a first transmission connection for data transmission with an agent of the target service.

Here, the connector may carry a proxy address to be requested in the second connection establishment request, and the proxy address may include an IP address and port of a proxy.

In step S508, a third connection establishment request carrying the address identifier of the target service is transmitted to the agent based on the first transmission connection, whereby the agent establishes a third transmission connection with the target service based on the address identifier of the target service.

Here, the gateway may transmit a third connection establishment request to the agent of the target service based on the pre-established first transmission connection, and after receiving the third connection establishment request, the agent of the target service may determine a target service to be connected based on the address identifier of the target service, thereby establishing a third transmission connection with the target service.

In the embodiments of this disclosure, in a case of receiving a second connection establishment request transmitted by the connector, the gateway establishes a second transmission connection with the connector, determines an address identifier of a target service to be accessed by the connector based on a proxy address requested by the second connection establishment request, and a first transmission connection for data transmission with an agent of the target service, and transmits a third connection establishment request carrying the address identifier of the target service to the agent based on the first transmission connection, whereby the agent establishes a third transmission connection with the target service based on the address identifier of the target service. In this way, a full link connection between the iPaaS system and the target service can be quickly established.

In some embodiments, reference is made to FIG. 6A. FIG. 6A is a schematic flowchart of a data transmission method in service integration according to embodiments of this disclosure. Based on FIG. 3, step S102 may be implemented by the following steps S601 to S603, and step S103 may be implemented by the following step S604. The description will be made below in conjunction with the steps, and the execution body of the following steps may be the gateway described above.

In step S601, an address of a connector which transmits the data transmission request, an address of a proxy which receives the data transmission request, and an address of a target service to be accessed by the connector are acquired.

Here, a source address and a destination address of a request message may be acquired by parsing a data transmission request message. The source address of the request message is an address of a connector which transmits the data transmission request, and the destination address of the request message is an address of a proxy which receives the data transmission request. The data transmission request message may also carry the address of the target service to be accessed by the connector.

In step S602, a connection track of the gateway is queried based on the address of the connector and the address of the proxy to obtain an address identifier of the target service to be accessed by the connector.

Here, the connection track of the gateway is used for recording the corresponding relationship between the address of the connector or the address of the proxy in the gateway and the address identifier of the target service. The address identifier of the target service to be accessed by the connector may be a unique identifier allocated by the gateway to the address of the target service to be accessed by the connector based on the proxy after receiving the data transmission request transmitted by the connector. During implementation, the address identifier of the target service to be accessed by the connector may be recorded in the connection track of the gateway after binding with the address of the connector or the address of the proxy.

In step S603, configured service configuration information is queried based on the address of the proxy to obtain a first transmission connection for data transmission between the gateway and an agent of the target service.

In step S604, the data transmission request, the address of the target service and the address identifier of the target service are transmitted to the agent through the first transmission connection, whereby the agent queries a connection track of the agent based on the address identifier, determines an address of the agent, and transmits, through the address of the agent and the address of the target service, the data transmission request of the connector to the target service to be accessed by the connector.

Here, the address of the agent may include a port in the agent for data transmission with the target service. The connection track of the agent is used for recording the corresponding relationship between the address identifier of the target service in the agent and the address of the agent. After receiving the data transmission request, the address of the target service and the address identifier of the target service transmitted by the gateway, the agent of the target service queries whether there is a record corresponding to the address identifier of the target service in the connection track of the agent. If there is no record corresponding to the address identifier of the target service in the connection track of the agent, an address of the agent is allocated to the target service based on the received address of the target service, and the allocated address of the agent is bound to the address identifier of the target service and then recorded in the connection track of the agent.

In some embodiments, the above-mentioned step S602 may be implemented by the following steps S621 to S622: In step S621, in response to not querying records corresponding to the address of the connector and the address of the proxy in the connection track of the gateway, an address identifier of the target service to be accessed by the connector is generated based on the address of the target service. In step S622, a record constituted by the address of the connector, the address of the proxy and the address identifier of the target service is added to the connection track of the gateway.

In the embodiments of this disclosure, the corresponding relationship between the address of the connector or the address of the proxy in the gateway and the address identifier of the target service is recorded through the connection track of the gateway, and the corresponding relationship between the address identifier of the target service and the address of the agent in the agent is recorded through the connection track of the agent. In this way, when the gateway and the agent perform data transmission, mapping between the address of the connector or the address of the proxy and the address of the agent can be realized based on the connection track of the gateway and the connection track of the service agent so as to realize mapping between the address of the connector or the address of the proxy and the address of the target service. Since only the first transmission connection needs to be maintained during the process of the connector transmitting data to the target service through the gateway and the agent, the data transmission delay can be reduced to a certain extent and the data transmission efficiency can be improved.

In some embodiments, reference is made to FIG. 6B. FIG. 6B is a schematic flowchart of a data transmission method in service integration according to embodiments of this disclosure. Based on FIG. 6A, the method may further include the following steps S605 to step S607 to be performed. The description will be made below in conjunction with the steps, and the execution body of the following steps may be the gateway described above.

In step S605, response data returned by the agent and the address identifier of the target service to be accessed by the connector are received through the first transmission connection.

In step S606, the connection track of the gateway is queried based on the address identifier of the target service to obtain an address of a proxy which transmits the response data and an address of a connector which receives the response data.

In step S607, the response data is transmitted to the connector based on the address of the proxy and the address of the connector.

In the embodiments of this disclosure, the gateway receives response data returned by the agent and the address identifier of the target service through the first transmission connection, and queries the connection track of the gateway based on the address identifier of the target service to obtain an address of a proxy which transmits the response data and an address of a connector which receives the response data, so as to transmit the response data to the connector based on the address of the proxy and the address of the connector. In this way, the response data of the target service can be quickly returned to the connector.

The data transmission method in service integration according to the embodiments of this disclosure will be described below in combination with exemplary applications and implementations of the agent according to the embodiments of this disclosure.

Reference is made to FIG. 7. FIG. 7 is a schematic flowchart of a data transmission method in service integration according to embodiments of this disclosure. The description will be made below in conjunction with the steps shown in FIG. 7, and the execution body of the following steps may be the agent described above.

In step S701, the agent receives a data transmission request of a connector of an iPaaS system and an address identifier of a target service to be accessed by the connector, the data transmission request being transmitted by a gateway of the iPaaS system. The iPaaS system is deployed on a first VPC of a tenant to which the iPaaS system belongs in a cloud network, the agent is deployed in an Intranet of the tenant, and the target service is deployed in the Intranet or a second VPC of the tenant. For example, a data transmission request of an iPaaS system and an address identifier of a service to be accessed by the iPaaS system are received by data transmission circuitry associated with the service. The data transmission request is transmitted by a gateway of the iPaaS system, the iPaaS system is deployed on a first virtual private cloud (VPC) in a cloud network, the data transmission circuitry is deployed in an Intranet, and the service is deployed in the Intranet or a second VPC. The address identifier of the service includes at least one of an IP address or a port number.

In step S702, the data transmission request of the connector is transmitted to the target service to be accessed by the connector based on the address identifier. For example, the data transmission request of the iPaaS system is transmitted to the service based on the address identifier of the service.

In step S703, in a case of receiving response data transmitted by the target service to be accessed by the connector, a first transmission connection for data transmission between the agent and the gateway is determined based on the address identifier of the target service. The first transmission connection is established based on a first connection establishment request initiated by the agent. For example, a first transmission connection between the data transmission circuitry and the gateway is determined in response to receiving response data transmitted by the service based on the address identifier of the service. The first transmission connection is established based on a first connection establishment request initiated by the data transmission circuitry.

In step S704, the response data of the target service and the address identifier of the target service are transmitted to the gateway through the first transmission connection, whereby the gateway determines the connector based on the address identifier, and transmits the response data of the target service to the connector. For example, the response data of the service and the address identifier of the service are transmitted to the gateway through the first transmission connection, the gateway transmitting the response data of the service to requesting logic of the iPaaS system.

Here, the connector is a connector for receiving response data transmitted by the target service in the iPaaS system.

In the embodiments of this disclosure, an agent deployed in a tenant Intranet receives a data transmission request transmitted by a gateway of an iPaaS system deployed on a first VPC and an address identifier of a target service, transmits the data transmission request to the target service deployed in the Intranet or a second VPC based on the address identifier, and determines, in a case of receiving response data transmitted by the target service, a first transmission connection for data transmission between the agent and the gateway based on the address identifier of the target service. The first transmission connection is pre-established based on a first connection establishment request initiated by the agent. The response data of the target service and the address identifier of the target service are transmitted to the gateway through the first transmission connection, whereby the gateway determines a connector to access the target service in the iPaaS system based on the address identifier, and transmits the response data to the connector. In this way, network intercommunication between the iPaaS system and a tenant Intranet can be realized, and the integration logic of services in the Intranet can be realized. In addition, the iPaaS system is deployed on the first VPC of the tenant, the target service is deployed on the Intranet or a second VPC of the tenant, and the data transmission request is transmitted to the agent of the target service through the first transmission connection, thus realizing the integration logic of services in different Intranets or different VPCs of the same tenant, so as to perfect the service integration capability of the iPaaS system. Moreover, the development, maintenance and iteration costs of the iPaaS system can be effectively reduced.

In some embodiments, before step S703, the method may further include the following step S801 to be performed:

In step S801, the agent transmits a first connection establishment request to the gateway, and establishes a first transmission connection with the gateway. The first connection establishment request includes services of the agent, whereby after establishing the first transmission connection with the gateway, for each service in the services, a proxy address is allocated to the service, and a corresponding relationship between an address identifier of the service and the proxy address is added to service configuration information.

In some embodiments, step S702 may be implemented by the following steps S901 to S902:

In step S901, a third transmission connection pre-established between the agent and the target service to be accessed by the connector (request logic of the iPaaS system) is determined based on the address identifier.

In step S902, the data transmission request of the connector is transmitted to the target service through the third transmission connection.

Correspondingly, step S704 may be implemented by the following steps S903:

In step S903, the response data of the target service and the address identifier of the target service are transmitted to the gateway through the first transmission connection, whereby the gateway determines the connector and a second transmission connection established with the connector based on the address identifier, and transmits the response data of the target service to the connector through the second transmission connection.

In some embodiments, before step S901, the method may further include the following step S904 to be performed:

In step S904, a third transmission connection is established with the target service based on the address identifier of the target service in response to receiving a third connection establishment request which is transmitted by the gateway and carries the address identifier of the target service to be accessed.

In some embodiments, step S702 may be implemented by the following steps S1001 to S1002:

In step S1001, a connection track (register) of the agent (data transmission circuitry) is queried based on the address identifier to obtain an address of the agent and an address of the target service to be accessed by the connector.

In step S1002, the data transmission request of the connector is transmitted to the target service to be accessed by the connector through the address of the agent and the address of the target service.

Correspondingly, before step S703, the following steps S1003 to S1004 may also be performed:

In step S1003, an address of the target service to be accessed by the connector and an address of an agent which receives the response data of the target service are acquired.

In step S1004, a connection track of the agent is queried based on the address of the target service and the address of the agent to obtain an address identifier of the target service.

In some embodiments, the above-mentioned step S1001 may be implemented by the following steps S1005 to S1006:

In step S1005, in response to not querying a record corresponding to the address identifier in the connection track of the agent, the address of the agent is allocated to the target service based on the address of the target service to be accessed by the connector.

In step S1006, a record constituted by the address of the target service, the address of the agent and the address identifier is added to the connection track of the agent.

It is to be noted that descriptions about the above agent-based method embodiments are similar to descriptions about the above-mentioned gateway-based method embodiments, and the agent-based method embodiments have similar beneficial effects to those of the gateway-based method embodiments. Technical details not disclosed in the agent-based method embodiments of this disclosure may be understood with reference to the gateway-based method embodiments of this disclosure.

An exemplary application of the embodiments of this disclosure in an actual application scenario will be described below.

Taking integration intercommunication between a connector in an iPaaS system and a service in a target Intranet as an example, the embodiments of this disclosure provide a service integration system. Reference is made to FIG. 8A. FIG. 8A is a schematic diagram of an implementation architecture of a service integration system according to embodiments of this disclosure. The system includes an agent 111, an internal system 112 and a database 113 which are deployed in a client Intranet 110, an agent 121 and an internal private SaaS 122 which are deployed in a client Intranet 120, an iPaaS system 130 deployed on a public cloud VPC, and a public network SaaS 141 deployed on the public cloud. The agent may access the public cloud but cannot perform detection on the public cloud. By actively accessing the iPaaS system 130 through the agent, network intercommunication between the agent and the iPaaS system 130 can be realized. Meanwhile, considering the compatibility with an existing iPaaS system and the cost of reconstruction, the coupling degree is reduced. A gateway 131 is arranged inside iPaaS, and the gateway 131 may assist in network intercommunication between the iPaaS system 130 and the Intranets 110 and 120, thereby enabling integration logic between the internal system 112, the database 113, the internal private SaaS 122, and the public network SaaS 141.

Reference is made to FIG. 8B. FIG. 8B is a schematic diagram of an implementation architecture of a service integration system according to embodiments of this disclosure. In order to realize the integration intercommunication between a connector (a connector 1321, a connector 1322 and a connector 132n are exemplarily shown, where n is a positive integer) in an iPaaS system deployed on an iPaaS VPC and a service (a service 1121, a service 1122 and a service 112n are exemplarily shown) in a client Intranet, three modules are newly added: a gateway 131, a registration center 133 and an agent (an agent 1111, an agent 1112 and an agent 111n are exemplarily shown), where the gateway 131 and the registration center 133 are deployed on the iPaaS VPC, and the agent is deployed in the client Intranet, while allowing multiple agents to be deployed in the client Intranet according to region/service divisions. Meanwhile, a corresponding proxy (a proxy 1311, a proxy 1312 and a proxy 131n are exemplarily shown) is created for each service of the client Intranet in the gateway, and there is a one-to-one correspondence therebetween. The communication between the connector and the proxy is equivalent to the direct communication with the service corresponding to the proxy, and there is no perception for a user of the iPaaS system. The advantages of this implementation architecture are mainly as follows: 1) The modification cost of the connector in the existing iPaaS system is minimal, no communication-related code needs to be modified, only the mapping logic of a service IP/port and a proxy IP/port) needs to be newly added, and a corresponding proxy is connected in the manner of connecting the service originally. 2) Code coupling can be reduced, only business processing logic is concerned inside connector components, and specific network interconnection is uniformly processed by the gateway.

Reference is made to FIG. 8C. FIG. 8C is a schematic diagram of an interaction flow between various modules in a service integration system according to embodiments of this disclosure. The flow includes the following steps:

Step S1101: An agent actively requests to establish a connection, i.e. a first transmission connection (agent connection), with a gateway.

Step S1102: The gateway creates a corresponding proxy for each service of the agent.

Step S1103: After creating the proxy successfully, the gateway registers the created proxy in a registration center.

Step S1104: When connecting Service IP/Port, a connector determines a corresponding Proxy IP/Port from the registration center according to Service IP/Port.

Step S1105: The connector directly communicates with the corresponding Proxy IP/Port.

Step S1106: The gateway maps the communication between the connector and the proxy to the communication between the agent and the service through the agent connection, and returns data to the connector after the data transmission is completed, so as to complete a complete communication.

The above-mentioned interaction flow includes the following entities: a private cloud, a gateway, a proxy, and an agent. A registration center maintains meta and configuration files corresponding to the respective entities, and the main meta saved by the registration center includes:

1) Private Cloud Meta:

The meta may include an application identifier (AppId), a cloud identifier (CloudId), a cloud name, services, a source IP address white list (SourceIpWhiteList), a status, and an agent connection list. The status of the private cloud meta includes one of the following statuses: ENABLED, DISABLING and DISABLED. Reference is made to FIG. 8D. FIG. 8D is a schematic diagram of status transition of private cloud meta in a service integration system according to embodiments of this disclosure. When the private cloud meta is disabled in the status ENABLED, the status DISABLING is entered. After the private cloud meta has been disabled, the status DISABLED is entered. When the private cloud meta is enabled in the status DISABLED, the status ENABLED is entered. The services may include at least one service. Each service may include an IP, a port and a mode. The mode may include an NAT mode and a forward mode. The agent connection list may include at least one agent connection. Each agent connection may include an identifier of the agent connection AgentConnectionId, an identifier of a gateway GatewayId and a status. The status of the agent connection may be CONNECTED or DISCONNECTED.

2) Gateway Meta:

The meta may include an identifier of a gateway (GatewayId), an IP address of a gateway (GatewayIp), a status, and heartbeat information (Heartbeat). Here, the status of the gateway may be ACTIVE or UNAVAILABLE, etc.

3) Proxy Meta:

The meta may include a cloud identifier (CloudId), an IP address of a service (ServiceIp), a port of a service (ServicePort), an IP address of a proxy (ProxyIp), a port of a proxy (ProxyPort), and an identifier of an agent connection connecting a proxy (AgentConnectionId).

The configuration file saved by the registration center includes an agent configuration file. The agent configuration file may include an authentication sequence number of an application (AppKey), an authentication secrete key of an application (AppSecret), a cloud identifier (CloudId), and a service white list.

Embodiments of this disclosure provide a data transmission method in service integration. Referring to FIG. 9, the method includes the following steps S1201 to S1213:

Step S1201: Create a security gateway (i.e. a private cloud) in a registration center.

Step S1202: Create an agent configuration file in a client Intranet, and deploy and start an agent program.

Step S1203: After an agent is started, actively establish a connection, i.e. an agent connection, with the gateway.

Step S1204: After the connection is successful, the agent transmits a handshake instruction to the gateway, including signatures of parameters AppKey, AppId, CloudId, ServiceWhiteList, and AppSecret.

Step S1205: After the gateway receives the handshake instruction, obtain AppId through authentication, and then acquire private cloud meta from the registration center according to AppId+CloudId.

Step S1206: If the authentication fails, or a private cloud does not exist, or the status of the private cloud is not available, or a source IP of the handshake instruction is not in SourceIpWhiteList, or the number of available ports is insufficient, the gateway returns a corresponding error.

Step S1207: After the verification is passed, the Gateway allocates AgentConnectionId associated with the connection thereto, and registers the connection to AgentConnectionList of the private cloud meta.

Step S1208: The gateway acquires all services in the private cloud meta, filters out each service contained in ServiceWhiteList from all the services in the private cloud meta when ServiceWhiteList is specified in a handshake message, and allocates a proxy port to each service.

For each service, the following operations may be executed:

Step S1208a: Allocate a proxy port in an available port pool of the gateway.

Step S1208b: The gateway attempts to detect the allocated proxy port, and puts the proxy port back into the port pool after sleeping for 1 second (s) when the detection fails, and the process returns to step S1208a. When the detection is successful, the process proceeds to step S1208c.

Step S1208c: The Gateway creates proxy meta in the registration center, where ProxyIp of the proxy meta is an Intranet IP of a gateway node, a proxy port is an allocated proxy port, AgentConnectionId is AgentConnectionId associated with the connection, and Service IP/Port corresponds to an IP address and port of a current service.

Step S1209: Specify a private cloud when configuring a connector.

Step S1210: When the connector establishes a connection with a target service and when a parameter CloudId is specified, acquire private cloud meta from the registration center according to AppId+CloudId, and when the private cloud meta does not exist or the status is not available, perform error reporting processing.

Step S1211: When a target Service IP/Port is not in a service list, the connector directly connects the target Service IP/Port for communication; otherwise, according to the target IP, Port, AppId and CloudId, the connector searches for a proxy with non-timeout heartbeat and an agent connection in the status CONNECTED from the gateways in the status ACTIVE, and performs error reporting processing if not found.

Step S1212: The connector selects one proxy from the at least one proxy found according to a load balancing policy and is in connection and communication with the selected Proxy IP/Port.

Step S1213: The gateway and the agent collectively complete port mapping between Proxy IP/Port and Service IP/Port. During implementation, the port mapping supports both NAT and traffic forward modes.

In the above-mentioned flow, the operations of a console may include: 1) Create a private cloud. 2) Start and stop the private cloud. 3) Maintain/delete private cloud meta in a stopped state. 4) View a network structure topology diagram in which the private cloud is connected to an agent.

The gateway may achieve system control by performing the following steps:

Step S1301: Acquire a gateway IP after the gateway is started.

Step S1302: Query an ACTIVE gateway in a registration center according to the gateway IP, and delete the gateway. In this way, it is possible to avoid repeatedly starting gateways of the same IP.

Step S1303: Allocate GatewayId, and register GatewayId to the registration center.

Step S1304: Initialize a port pool.

Here, the initialization of the port pool may be implemented using the following steps S1304a to S1304d.

Step S1304a: All GatewayIds with the same gateway IP, deleted and the last heartbeat time being within a max proxy lifetime (MPL) are found from the registration center, and corresponding ports are found from the registration center.

Here, the MPL is used for preventing the proxy from being connected in error. Within the MPL of the proxy, the same group of IP/ports will not be reused. A client of the connector needs to be within the MPL of the proxy when using Proxy IP/Port, and the MPL may default to 10 minutes.

Step S1304b: Put each port in a delay queue, where the time is the last heartbeat time +MPL of GatewayId corresponding to the port.

Step S1304c: Put the remaining available ports in a delay queue head to obtain a delay queue, i.e. a port pool.

Step S1305: Start to receive a connection from the agent.

Step S1306: Periodically update the heartbeat time of the gateway in the registration center, when it is determined that the gateway is deleted, interrupt all agent connections, and stop the proxy port and restart the service.

Step S1307: Periodically delete the heartbeat-timeout gateway.

Step S1308: The gateway periodically activates the agent connection, and when the agent connection is unavailable, disconnects, and updates the status of the agent connection as DISCONNECTED.

Here, the agent also periodically activates the agent connection, disconnects when the agent connection is unavailable, and re-establishes the connection.

Step S1309: When disabling the private cloud, the gateway may execute the following operations:

Step S1309a: Mark a status in private cloud meta to be disabled as DISABLING.

Step S1309b: Successively call a disconnection port of the gateway corresponding to each agent connection, and after the calling is completed, mark the status in the private cloud meta as DISABLED.

In the data transmission method in service integration according to the embodiments of this disclosure, it is necessary to ensure the state consistency of the private cloud, the gateway and the agent connection. The respective statuses have the following consistency priority: status consistency of private cloud >status consistency of gateway >status consistency of agent connection. The status consistency of the gateway and the status consistency of the agent connection may be ensured in the following manners:

1) Ensure status consistency of gateway

When the gateway is unavailable, the status is inconsistent, and the gateway is deleted by other nodes after the heartbeat timeout, so as to ensure the status consistency.

When the gateway is partitioned, the gateway will be deleted by other nodes after the heartbeat timeout. After the partition is restored, the status is inconsistent, the heartbeat detects that the gateway actively restarts after being deleted, so as to ensure the status consistency.

2) Ensure status consistency of agent connection

When the gateway is unavailable and the agent is not connected to the gateway, the agent automatically restarts, and the status consistency is achieved.

When the agent is unavailable, the gateway is not connected to the agent, the corresponding agent connection is marked as DISCONNECTED, and the status consistency is achieved.

In a case of network inaccessibility of the gateway, the agent is not connected to the gateway, and the agent automatically restarts. In a case of network connectivity of the gateway, when the agent is unavailable, the gateway is not connected to the agent, the corresponding agent connection is marked as DISCONNECTED, and the status consistency is achieved.

In a case of network inaccessibility of the agent, the agent connection is disconnected, and the connection status is marked as DISCONNECTED. In a case of network connectivity of the agent, the connection is re-performed. In a case of network inaccessibility of the gateway, the agent is not connected to the gateway, and the agent automatically restarts. In a case of network connectivity of the gateway, when the agent is unavailable, the gateway is not connected to the agent, the corresponding agent connection is marked as DISCONNECTED, and the status consistency is achieved.

In summary, in the data transmission method in service integration according to the embodiments of this disclosure, the functions of port mapping between Proxy IP/Port and Service IP/Port are collectively completed by the gateway deployed in the iPaaS Intranet and the agent deployed in the client Intranet, and both NAT and traffic forward port mapping modes are supported. The principle of port mapping in both modes will now be described.

1) Traffic Forward Mode

Reference is made to FIG. 10. FIG. 10 is a schematic diagram of a composition architecture of a service integration system for port mapping using a traffic forward mode according to embodiments of this disclosure. In a traffic forward mode, a complete link between a connector 1010 of an iPaaS system and a target service 1040 needs to establish three TCP connections, including a client connection established between the connector 1010 and a proxy 1021 of the gateway 1020, an agent connection established between the proxy 1021 of the gateway 1020 and an agent 1030, and a service connection established between the agent 1030 and the service 1040, i.e. a third transmission connection. The gateway 1020 and the agent 1030 may collectively act as a distributed agent gateway.

In service integration, data transmission based on the traffic forward mode mainly includes two flows: full link connection establishment and data transmission, and connection interruption and error processing need to be considered. The respective flows will be described below.

The full link connection establishment may include the following steps S1401 to S1405:

Step S1401: A client of a connector establishes a client connection, i.e. a second transmission connection, with a proxy through three handshakes of a TCP.

Step S1402: A gateway allocates an identifier ConnectionId to the client connection.

Step S1403: The gateway transmits a connection establishment instruction to an agent connection corresponding to the proxy, and waits for return.

Here, the connection between the gateway and the agent is an RPC connection, and an RPC message format corresponding to the connection establishment instruction is as follows:

Cmd: Establish
ConnectionId: xxx
Service IP/PORT: xxx:xxx, where Cmd is a control type, Establish represents connection establishment, ConnectionId is a unique identifier allocated to the client connection, and Service IP/PORT is an IP address/port of a target service.

Step S1404: An agent establishes a service connection with a target Service IP/Port through the three handshakes of the TCP, and binds the connection with ConnectionId.

Step S1405: The agent returns a message of successful establishment or failed establishment to the gateway.

The data transmission flow includes two parts: uplink data transmission and downlink data transmission, and after the above-mentioned step S1402, the uplink data transmission flow may be executed, including the following steps S1411 to S1416:

Step S1411: The connector transmits a data stream to the proxy through the client connection.

Here, when transmitting a data stream, operations such as unpacking and grouping the data stream may be included, and a TCP message format when the connector transmits a data packet to the proxy is as follows:

Src: Client IP/Port
Dst: Proxy IP/Port
Flag: DATA
Payload, where a source address Src of a message is an IP address and port of the client of the connector, i.e. Client IP/Port, a destination address Dst of the message is an IP address and port of the proxy, i.e. Proxy IP/Port, Flag is a message flag, DATA represents a data transmitting message, and Payload is data-to-be-transmitted.

In addition, after receiving a message transmitted by the connector, the proxy will return an acknowledgment message to the connector.

Step S1412: The gateway acquires a corresponding ConnectionId according to the client connection, and acquires a corresponding agent connection according to the proxy.

Step S1413: The gateway transmits a data stream instruction to the agent through the agent connection, and waits for return.

Here, when transmitting a data stream, operations such as unpacking and grouping the data stream may be included, the agent connection may be either a TCP connection or an RPC connection, and an RPC message format when the gateway transmits a data packet to the agent connection is as follows:

Cmd: DATA
ConnectionId: xxx
Payload, where Cmd is a control type, DATA represents data transmission, Payload is data-to-be-transmitted, and ConnectionId is an identifier of the client connection. If the previous uplink data transmission instruction for the ConnectionId has not been returned, data is put into a wait queue for transmission.

Step S1414: The agent finds a corresponding service connection according to ConnectionId.

Step S1415: The agent transmits a data stream to the service through the service connection.

Here, when transmitting a data stream, operations such as unpacking and grouping the data stream may be included, and a TCP message format when the agent transmits a data packet to the service is as follows:

Src: Agent IP/Port
Dst: Service IP/Port
Flag: DATA
Payload, where a source address Src of a message is an IP address and port of the agent, i.e. Agent IP/Port, a destination address Dst of the message is an IP address and port of the service, i.e. Service IP/Port, Flag is a message flag, DATA represents a data transmitting message, and Payload is data-to-be-transmitted.

Step S1416: The service returns a message of successful or failed transmission.

In addition, after receiving a message transmitted by the agent, the service will return an acknowledgment message indicating successful or failed transmission to the agent.

The downlink data transmission flow includes the following steps S1421 to S1426:
connection.

Step S1421: The service transmits a data stream to the agent through the service Here, when transmitting a data stream, operations such as unpacking and grouping the data stream may be included, and a TCP message format when the service transmits a data packet to the agent is as follows:

Src: Service IP/Port
Dst: Agent IP/Port
Flag: DATA
Payload, where a source address Src of a message is an IP address and port of the service, i.e. Service IP/Port, a destination address Dst of the message is an IP address and port of the agent, i.e. Agent IP/Port, Flag is a message flag, DATA represents a data transmitting message, and Payload is data-to-be-transmitted.

In addition, after receiving a message transmitted by the service, the agent will return an acknowledgment message to the service.

Step S1422: The agent determines ConnectionId according to the service connection.

Step S1423: The agent transmits a data stream instruction to the proxy through the agent connection.

Here, when transmitting a data stream, operations such as unpacking and grouping the data stream may be included, the agent connection may be either a TCP connection or an RPC connection, and an RPC message format when the agent transmits a data packet through the agent connection is as follows:

Cmd: DATA
ConnectionId: xxx
Payload, where Cmd is a control type, DATA represents data transmission, Payload is data-to-be-transmitted, and ConnectionId is an identifier of the client connection. If the previous downlink data transmission instruction for the ConnectionId has not been returned, data is put into a wait queue for transmission.

Step S1424: The gateway determines a corresponding client connection according to ConnectionId.

Step S1425: The gateway transmits a data stream to the connector through the client connection.

Here, when transmitting a data stream, operations such as unpacking and grouping the data stream may be included, and a TCP message format when the gateway transmits a data packet to the connector is as follows:

Src: Proxy IP/Port
Dst: Client IP/Port
Flag: DATA
Payload, where a source address Src of a message is an IP address and port of the proxy, i.e. Proxy IP/Port, a destination address Dst of the message is an IP address and port of the client of the connector, i.e. Client IP/Port, Flag is a message flag, DATA represents a data transmitting message, and Payload is data-to-be-transmitted.

Step S1426: The connector returns a message of successful or failed transmission.

Here, after receiving a message transmitted by the proxy, the connector will return an acknowledgment message indicating successful or failed transmission to the proxy.

In the above-mentioned data transmission method for port mapping using a traffic forward mode according to the embodiments of this disclosure, interruption and error processing for each connection may include:

(1) The passive disconnection process for a client connection is as follows:
  a. The gateway detects disconnection of the client connection such as timeout, restart, or connector disconnection.
  b. The gateway marks the status of ConnectionId as DISCONNECTED.
  c. The gateway transmits a disconnection instruction to the agent through the agent connection, the disconnection instruction carrying a parameter ConnectionId.
  d. The agent marks the status of ConnectionId as DISCONNECTED after receiving the instruction, and disconnects the corresponding service connection.
  e. The gateway returns an error when subsequently receiving a downlink instruction of ConnectionId through the agent connection.

(2) The passive disconnection process for a service connection is as follows:
  a. The agent detects disconnection of the service connection such as timeout, restart, or service disconnection.
  b. The agent marks ConnectionId as DISCONNECTED.
  c. The agent transmits a disconnection instruction to the gateway through the agent connection, the disconnection instruction carrying a parameter ConnectionId.
  d. The gateway marks ConnectionId as DISCONNECTED after receiving the instruction, and disconnects the corresponding client connection.
  e. The agent returns an error when subsequently receiving an uplink instruction of the ConnectionId by the gateway through the agent connection.

(3) When transmitting an uplink instruction return error, the gateway marks the corresponding ConnectionId as DISCONNECTED, and disconnects the corresponding client connection.

(4) When transmitting a downlink instruction return error, the agent marks the corresponding ConnectionId as DISCONNECTED, and disconnects the corresponding service connection.

The above-mentioned data transmission method for port mapping using a traffic forward mode according to the embodiments of this disclosure is simple in implementation, reliable in connection, can make full use of the existing TCP support capability in an operating system kernel, and has good data transmission performance.

2) NAT Mode

Reference is made to FIG. 11. FIG. 11 is a schematic diagram of a composition architecture of a service integration system for port mapping using an NAT mode according to embodiments of this disclosure. In an NAT mode, when data transmission is performed between the connector 1010 of the iPaaS system and the target service 1040, address translation needs to be performed through the gateway 1020 and the agent 1030. An agent connection is pre-established between each proxy 1021 in the gateway 1020 and the agent 1030. When data transmission is performed based on the agent connection, the mapping between Proxy IP/Port and Service IP/Port is realized through a gateway connection track 1022 (gateway connection register) maintained by the gateway and an agent connection track 1031 (agent connection register) maintained by the agent, so as to realize network intercommunication between the connector and the service.

In service integration, when data transmission is performed based on the NAT mode, the following steps S1501 to S1517 may be included:

Step S1501: The client transmits a TCP handshake message SYN packet to the proxy.

Step S1502: After receiving the SYN packet, the gateway searches for ConnectionId and corresponding status data from the gateway connection track according to Client IP/Port+Proxy Port.

Step S1503: Determine the type of the SYN packet, and perform the following operations according to different SYN packet types:
  a. When there is no ConnectionId corresponding to Client IP/Port+Proxy Port in a record of the gateway connection track, the packet is a packet arriving for the first time, and after allocating a new ConnectionId and registering to the gateway connection track, the process proceeds to step S1504.

b. When the record of the gateway connection track shows ClientFlag==SYN and Client Seq==seq1, the packet is a retransmission packet, and the process proceeds to step S1504. Otherwise, the packet is an out-of-order packet, and the packet is ignored.

Step S1504: The gateway transmits a synchronization instruction to the agent through the agent connection.

Here, instruction transmission may be performed in an RPC manner, and a message of the synchronization instruction may include ConnectionId, Service IP/Port and an original TCP message with a port number removed.

Step S1505: After receiving the synchronization instruction, the agent searches for an agent port and status data from the agent connection track according to ConnectionId.

Step S1506: The agent determines a message type, including:

a. When there is no agent port corresponding to ConnectionId in a record of the agent connection track, the packet is a packet arriving for the first time, after allocating the agent port, the agent port is registered to the agent connection track, and after updating ClientFlag and ClientSeq in the corresponding record, the process proceeds to step S1507.

b. When the record corresponding to ConnectionId in the record of the agent connection track shows ClientFlag==SYN and Client Seq==seq1, the packet is a retransmission packet, and the process proceeds to step S1507. Otherwise, the packet is an out-of-order packet, and the packet is ignored.

Step S1507: The agent transmits a TCP message to Service IP/Port through the agent port, where a source address in the TCP message is Agent IP/Port, a destination address is Service IP/Port, a message flag bit is SYN, i.e. an SYN packet is to be transmitted, and Seq is seq1.

Step S1508: After receiving the SYN packet, the service replies with an SYN|ACK packet, where the source address in the corresponding TCP message is Service IP/Port, the destination address is Agent IP/Port, the message flag bit is SYN|ACK, Seq is seq2, and Ack is seq1+1.

Step S1509: After receiving the SYN|ACK packet, the agent searches for ConnectionId and corresponding status data from the agent connection track according to Service IP/Port and Agent Port.

Step S1510: The agent determines a message type, including:

a. When there is no ConnectionId corresponding to Service IP/Port and Agent Port in the record of the agent connection track, the packet is an out-of-order packet, and the packet is ignored.

b. When the record corresponding to ConnectionId in the record of the agent connection track shows ClientFlag!=SYN and ClientSeq!=packet Ack (i.e. seq1+1), the packet is an out-of-order packet, and the packet is ignored.

c. When the record corresponding to ConnectionId in the record of the agent connection track shows ServiceFlag==nil and ServiceSeq==nil, the packet is the first SYN|ACK packet, ServiceFlag and ServiceSeq are updated, and the process proceeds to step S1511.

d. When the record corresponding to ConnectionId in the record of the agent connection track shows ServiceFlag==packet Flag (i.e. SYN|ACK) and ServiceSeq==packet Seq (i.e. seq2), the packet is a retransmission packet, and the process proceeds to step S1511.

e. Otherwise, the packet is an out-of-order packet, and the packet is ignored.

Step S1511: The agent transmits a synchronization reply instruction to the gateway, an RPC message of the reply instruction including a control field Cmd, ConnectionId and an original TCP message with a port number removed.

Step S1512: After receiving the synchronization reply instruction, the gateway searches for Client IP/Port, Proxy Port and status data from the gateway connection track according to ConnectionId.

Step S1513: The gateway determines a message type, including:

a. When there is no Client IP/Port and Proxy Port corresponding to ConnectionId in the record of the gateway connection track, the packet is an out-of-order packet, and the packet is ignored.

b. When there is no record corresponding to ConnectionId in the record of the gateway connection track, which shows ClientFlag!=SYN and ClientSeq!=packet Ack (i.e. seq1+1), the packet is an out-of-order packet, and the packet is ignored.

c. When there is no record corresponding to ConnectionId in the record of the gateway connection track, which shows ServiceFlag==nil and ServiceSeq==nil, the packet is the first SYN|ACK packet, ServiceFlag and ServiceSeq are updated, and the process proceeds to step S1514.

d. When there is no record corresponding to ConnectionId in the record of the gateway connection track shows ServiceFlag==packet Flag (i.e. SYN|ACK) and ServiceSeq==packet Seq (i.e. seq2), the packet is a retransmission packet, and the process proceeds to step S1514.

e. Otherwise, the packet is an out-of-order packet, and the packet is ignored.

Step S1514: The gateway transmits a TCP message to Client IP/Port through a proxy port, where the source address in the transmitted TCP message is Proxy IP/Port, the destination address is Client IP/Port, the flag bit Flag is SYN|ACK, Seq is seq2, and Ack is seq1+1.

Step S1515: After receiving an SYN|ACK packet transmitted by the gateway, the client replies to an ACK packet or an ACK|PSH packet.

Step S1516: When receiving an ACK packet or a PSH|ACK packet or a PSH packet transmitted from the client or a control message related to disconnection, the gateway matches the gateway connection track according to Client IP/Port and Proxy IP/Port, and determines a message type, including:

a. When the message type is a subsequent message, update the gateway connection track, and then transmit an instruction to the agent connection. Here, the subsequent message refers to a message normally received in order.

b. When the message type is a retransmission message, directly transmit an instruction to the agent connection.

c. When the message type is an out-of-order message, ignore the packet.

After receiving the instruction, similar to the gateway, the agent matches the agent connection track according to ConnectionId, and determines a message type, including:

a. When the message type is a subsequent message, update the agent connection track, and then transmit the received data packet to Service IP/Port through an agent port.
b. When the message type is a retransmission message, directly transmit the received data packet to Service IP/Port through the agent port.
c. When the message type is an out-of-order message, ignore the packet.

Step S1517: When receiving an ACK packet or a PSH|ACK packet or a PSH packet transmitted from the service or a control message related to disconnection, the agent matches the agent connection track according to Service IP/Port, and determines a message type:
a. When the message type is a subsequent message, update the agent connection track, and then transmit an instruction to the agent connection.
b. When the message type is a retransmission message, directly transmit an instruction to the agent connection.
c. When the message type is an out-of-order message, ignore the packet.

After receiving the instruction, the gateway matches the gateway connection track according to ConnectionId, and determines a message type:
a. When the message type is a subsequent message, update the gateway connection track, and then transmit the received data packet to Client IP/Port through a proxy port.
b. When the message type is a retransmission message, directly transmit the received data packet to Client IP/Port through the proxy port.
c. When the message type is an out-of-order message, ignore the packet.

In addition, for each proxy port, when the gateway receives an RST message for the proxy port or detects the end of four waving of a corresponding agent connection, data is put into a delay queue with a delay of 2 times a maximum segment lifetime (MSL), and then put back into an available proxy port pool.

For each agent port, when the agent receives an RST message for the agent port or detects the end of four waving of a corresponding agent connection, data is put into a delay queue with a delay of 2 times the MSL, and then put back into an available agent port pool.

In the above-mentioned data transmission method for port mapping using an NAT mode according to the embodiments of this disclosure, the TCP status is a real status, and there is no case where the connection status has been returned when the full link does not actually establish a connection. In addition, the whole data transmission process is performed on a TCP connection, and the delay is lower.

The service integration system according to the embodiments of this disclosure greatly reduces the development, maintenance and iteration costs compared with the privatization deployment scheme of iPaaS in the related art, can also satisfy the network connection between multiple Intranets of the same client, and can further improve the service integration capability of the iPaaS system.

An exemplary structure of the data transmission apparatus 255 in service integration according to the embodiments of this disclosure being implemented as a software module is continuously described below. In some embodiments, as shown in FIG. 2A, the software module in the data transmission apparatus 255 in service integration stored in the memory 250 may include:

a first receiving module 2551, configured to receive, by a gateway of an iPaaS system, a data transmission request transmitted by a connector of the iPaaS system, the iPaaS system being deployed on a first VPC of a tenant to which the iPaaS system belongs in a cloud network; a first mapping module 2552, configured to determine, based on configured service configuration information, an address identifier of a target service to be accessed by the connector, and a first transmission connection for data transmission between the gateway and an agent of the target service, the agent being deployed in an Intranet of the tenant, the target service being deployed in the Intranet or a second VPC of the tenant, and the first transmission connection being established based on a first connection establishment request initiated by the agent; and a first transmitting module 2553, configured to transmit the data transmission request and the address identifier of the target service to the agent through the first transmission connection, the agent transmitting, based on the address identifier, the data transmission request of the connector to the target service to be accessed by the connector.

In some embodiments: the apparatus further includes: a first establishment module, configured to establish a first transmission connection with the agent in response to receiving a first connection establishment request initiated by the agent, the first connection establishment request including services of the agent; and a first allocation module, configured to allocate, for each service in the services, a proxy address to the service, and add a corresponding relationship between an address identifier of the service and the proxy address to the service configuration information.

In some embodiments, the data transmission request is transmitted by the connector through a second transmission connection established with the gateway. The first mapping module is further configured to: query the service configuration information based on an identifier of the second transmission connection to obtain an address identifier of a target service to be accessed by the connector, and a first transmission connection for data transmission between the gateway and an agent of the target service. The first transmitting module is further configured to: transmit the data transmission request and the address identifier of the target service to the agent through the first transmission connection, whereby the agent determines, based on the address identifier, a third transmission connection established with the target service, and transmits, through the third transmission connection, the data transmission request of the connector to the target service to be accessed by the connector.

In some embodiments, the apparatus further includes: a second receiving module, configured to receive, through the first transmission connection, response data returned by the agent and the address identifier of the target service, the response data being transmitted to the agent by the target service through the third transmission connection; a first query module, configured to query the service configuration information based on the address identifier of the target service to obtain an identifier of the second transmission connection; and a second transmitting module, configured to transmit the response data to the connector through the second transmission connection based on the identifier of the second transmission connection.

In some embodiments, the apparatus further includes: a second establishment module, configured to establish a second transmission connection with the connector in response to receiving a second connection establishment request transmitted by the connector; a second query module, configured to query the service configuration information based on a proxy address requested by the second connection establishment request to obtain an address identifier of a target service to be accessed by the connector, and a first transmission connection for data transmission with an agent of the target service; and a third transmitting module, configured to transmit a third connection establishment request to the agent based on the first transmission connection. The third connection establishment request carries the address identifier of the target service, and the agent establishes a third transmission connection with the target service based on the address identifier of the target service.

In some embodiments, the first mapping module is further configured to: acquire an address of a connector which transmits the data transmission request, an address of a proxy which receives the data transmission request, and an address of a target service to be accessed by the connector; query a gateway connection track based on the address of the connector and the address of the proxy to obtain an address identifier of the target service to be accessed by the connector; and query configured service configuration information based on the address of the proxy to obtain a first transmission connection for data transmission between the gateway and an agent of the target service. The first transmitting module is further configured to: transmit the data transmission request, the address of the target service and the address identifier of the target service to the agent through the first transmission connection.

The agent queries an agent connection track based on the address identifier, determines an address of the agent, and transmits, through the address of the agent and the address of the target service, the data transmission request of the connector to the target service to be accessed by the connector.

In some embodiments, the first mapping module is further configured to: generate, in response to not querying records corresponding to the address of the connector and the address of the proxy in the gateway connection track, an address identifier of the target service to be accessed by the connector based on the address of the target service; and add a record constituted by the address of the connector, the address of the proxy and the address identifier of the target service to the gateway connection track.

In some embodiments, the apparatus further includes: a third receiving module, configured to receive, through the first transmission connection, response data returned by the agent and the address identifier of the target service to be accessed by the connector; a third query module, configured to query the gateway connection track based on the address identifier of the target service to obtain an address of a proxy which transmits the response data and an address of a connector which receives the response data; and a fourth transmitting module, configured to transmit the response data to the connector based on the address of the proxy and the address of the connector.

An exemplary structure of the data transmission apparatus 355 in service integration according to the embodiments of this disclosure being implemented as a software module is continuously described below. In some embodiments, as shown in FIG. 2B, the software module in the data transmission apparatus 355 in service integration stored in the memory 350 may include:

a fourth receiving module 3551, configured to receive, by an agent, a data transmission request of a connector of an iPaaS system and an address identifier of a target service to be accessed by the connector, the data transmission request being transmitted by a gateway of the iPaaS system, the iPaaS system being deployed on a first VPC of a tenant to which the iPaaS system belongs in a cloud network, the agent being deployed in an Intranet of the tenant, and the target service being deployed in the Intranet or a second VPC of the tenant;

a fifth transmitting module 3552, configured to transmit, based on the address identifier, the data transmission request of the connector to the target service to be accessed by the connector;

a fifth receiving module 3553, configured to determine, in response to receiving response data transmitted by the target service to be accessed by the connector, a first transmission connection for data transmission between the agent and the gateway based on the address identifier of the target service, the first transmission connection being established based on a first connection establishment request initiated by the agent; and a sixth transmitting module 3554, configured to transmit the response data of the target service and the address identifier of the target service to the gateway through the first transmission connection, the gateway determining the connector based on the address identifier, and transmitting the response data of the target service to the connector.

In some embodiments, the apparatus further includes: a third establishment module, configured to transmit, by the agent, a first connection establishment request to the gateway, and establish a first transmission connection between the agent and the gateway. The first connection establishment request includes services of the agent. After establishing the first transmission connection with the gateway, for each service in the services, a proxy address is allocated to the service, and a corresponding relationship between an address identifier of the service and the proxy address is added to service configuration information.

In some embodiments, the fifth transmitting module is further configured to: determine, based on the address identifier, a third transmission connection established between the agent and the target service to be accessed by the connector; and transmit the data transmission request of the connector to the target service through the third transmission connection. The sixth transmitting module is further configured to: transmit the response data of the target service and the address identifier of the target service to the gateway through the first transmission connection, determine, by the gateway, the connector and a first transmission connection established with the connector based on the address identifier, and transmit the response data of the target service to the connector through the first transmission connection.

In some embodiments, the apparatus further includes: a fourth establishment module, configured to establish a third transmission connection with the target service based on the address identifier of the target service in response to receiving a third connection establishment request transmitted by the gateway. The third connection establishment request carries the address identifier of the target service to be accessed by the connector.

In some embodiments, the fifth transmitting module is further configured to: query an agent connection track based on the address identifier to obtain an address of the agent and an address of the target service to be accessed by the connector; and transmit the data transmission request of the connector to the target service to be accessed by the connector through the address of the agent and the address of the target service. The fifth receiving module is further configured to: acquire an address of the target service to be accessed by the connector and an address of an agent which receives the response data of the target service; and query an agent connection track based on the address of the target service and the address of the agent to obtain an address identifier of the target service.

In some embodiments, the fifth transmitting module is further configured to: allocate, in response to not querying a record corresponding to the address identifier in the agent connection track, the address of the agent to the target service based on the address of the target service to be accessed by the connector; and add a record constituted by the address of the target service, the address of the agent and the address identifier to the agent connection track.

Embodiments of this disclosure provide a computer program product or a computer program, including computer instructions, the computer instructions being stored in a computer-readable storage medium. A processor of a computer device reads the computer instructions from the computer-readable storage medium, and executes the computer instructions, causing the computer device to perform the data transmission method in service integration of the embodiments of this disclosure.

Embodiments of this disclosure provide a computer-readable storage medium storing executable instructions, the executable instructions when executed by a processor, causing the processor to perform the data transmission method in service integration according to the embodiments of this disclosure, such as the method shown in FIG. 3 to FIG. 7.

In some embodiments, the computer-readable storage medium may be a memory such as an FRAM, a ROM, a PROM, an EPROM, an EEPROM, a flash memory, a magnetic surface memory, an optical disk, or a CD-ROM, or may be any device including one of or any combination of the foregoing memories.

In some embodiments, the executable instructions may be written in any form of programming language (including a compiled or interpreted language, or a declarative or procedural language) by using the form of a program, software, a software module, a script or a code, and may be deployed in any form, including being deployed as an independent program or being deployed as a module, a component, a subroutine, or another unit suitable for use in a computing environment.

As an example, the executable instructions may, but do not necessarily, correspond to a file in a file system, and may be stored in a part of a file that saves another program or other data, for example, be stored in one or more scripts in a hypertext markup language (HTML) file, stored in a single file that is specially used for a discussed program, or stored in a plurality of collaborative files (for example, be stored in files of one or modules, subprograms, or code parts).

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

As an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

In conclusion, according to the embodiments of this disclosure, network intercommunication between the iPaaS system and a tenant Intranet can be realized, and the integration logic of services in the Intranet can be realized. In addition, the iPaaS system is deployed on the first VPC of the tenant, the target service is deployed on the Intranet or a second VPC of the tenant, and the data transmission request is transmitted to the agent of the target service through the first transmission connection, thus realizing the integration logic of services in different Intranets or different VPCs of the same tenant, so as to perfect the service integration capability of the iPaaS system. Moreover, the development, maintenance and iteration costs of the iPaaS system can be effectively reduced.

The foregoing disclosure includes some exemplary embodiments of this disclosure which are not intended to limit the scope of this disclosure. Other embodiments shall also fall within the scope of this disclosure.

What is claimed is:

1. A data transmission method for service integration, the method comprising:
   receiving, by a gateway of an integration platform as a service (iPaaS) system, a data transmission request transmitted by the iPaaS system, the iPaaS system being deployed on a first virtual private cloud (VPC) in a cloud network, the data transmission request includes a request from the iPaaS system to access a service;
   determining, by the gateway based on service configuration information, an address identifier of the service to be accessed by the iPaaS system, and a first transmission connection between the gateway and a data transmission circuitry associated with the service, the data transmission circuitry being an agent deployed in an Intranet, the service being deployed in the Intranet or in a second VPC, and the first transmission connection being established based on a first connection establishment request initiated by the data transmission circuitry, the address identifier of the service comprising at least one of an IP address or a port number; and
   transmitting the data transmission request and the address identifier of the service from the gateway to the data transmission circuitry through the first transmission connection,
   the data transmission circuitry querying an agent connection register, and
   the data transmission circuitry transmitting, based on the query associated with the address identifier, the data transmission request of the iPaaS system to the service.

2. The method according to claim 1, further comprising:
   before the receiving,
   establishing the first transmission connection with the data transmission circuitry in response to receiving the first connection establishment request initiated by the data transmission circuitry, the first connection establishment request comprising services associated with the data transmission circuitry; and
   allocating, for each service of the services associated with the data transmission circuitry, a proxy address to the respective service, and adding a corresponding relationship between an address identifier of the respective service and the proxy address to the service configuration information.

3. The method according to claim 1, wherein
   the data transmission request is transmitted by the iPaaS system through a second transmission connection established between requesting logic of the iPaaS system and the gateway;

the determining comprises:
querying the service configuration information based on an identifier of the second transmission connection to obtain the address identifier of the service to be accessed by the iPaaS system, and to identify the first transmission connection between the gateway and the data transmission circuitry of the service; and
the transmitting, by the data transmission circuitry based on the address identifier, the data transmission request of the iPaaS system to the service to be accessed by the iPaaS system comprises:
determining, by the data transmission circuitry based on the address identifier, a third transmission connection established between the data transmission circuitry and the service, and transmitting, through the third transmission connection, the data transmission request of the iPaaS system to the service to be accessed by the iPaaS system.

4. The method according to claim 3, further comprising:
receiving, through the first transmission connection, response data returned by the data transmission circuitry and the address identifier of the service, the response data being transmitted to the data transmission circuitry by the service through the third transmission connection;
querying the service configuration information based on the address identifier of the service to obtain the identifier of the second transmission connection; and
transmitting the response data to the requesting logic of the iPaaS system through the second transmission connection based on the identifier of the second transmission connection.

5. The method according to claim 3, further comprising:
before the receiving,
establishing the second transmission connection with the requesting logic of the iPaaS system in response to receiving a second connection establishment request transmitted by the requesting logic of the iPaaS system;
querying the service configuration information based on a proxy address requested by the second connection establishment request to obtain the address identifier of the service, and to identify the first transmission connection for data transmission with the data transmission circuitry of the service; and
transmitting a third connection establishment request to the data transmission circuitry based on the identified first transmission connection,
the third connection establishment request carrying the address identifier of the service, and the data transmission circuitry establishing the third transmission connection with the service based on the address identifier of the service in the third connection establishment request.

6. The method according to claim 1, wherein
the determining comprises:
acquiring an address of requesting logic of the iPaaS system that transmitted the data transmission request, an address of a proxy which received the data transmission request, and an address of the service to be accessed by the requesting logic of the iPaaS system;
querying a gateway connection register based on the address of the requesting logic of the iPaaS system and the address of the proxy to obtain the address identifier of the service to be accessed by the requesting logic of the iPaaS system; and
querying the service configuration information based on the address of the proxy to obtain the first transmission connection between the gateway and the data transmission circuitry of the service; and
the transmitting the data transmission request and the address identifier of the service from the gateway to the data transmission circuitry through the first transmission connection comprises:
transmitting the data transmission request, the address of the service and the address identifier of the service to the data transmission circuitry through the first transmission connection,
the data transmission circuitry querying the agent connection register based on the address identifier, determining the address of the service, and transmitting, through the address of the data transmission circuitry and the address of the service, the data transmission request of the requesting logic of the iPaaS system to the service to be accessed by the requesting logic of the iPaaS system.

7. The method according to claim 6, wherein the querying the gateway connection register comprises:
generating, in response to not querying records corresponding to the address of the requesting logic of the iPaaS system and the address of the proxy in the gateway connection register, the address identifier of the service based on the address of the service; and
adding a record including the address of the requesting logic of the iPaaS system, the address of the proxy, and the address identifier of the service to the gateway connection register.

8. The method according to claim 6, further comprising:
receiving, through the first transmission connection, response data returned by the data transmission circuitry and the address identifier of the service;
querying the gateway connection register based on the address identifier of the service to obtain an address of a proxy which transmits the response data and the address of the requesting logic of the iPaaS system which is to receive the response data; and
transmitting the response data to the requesting logic of the iPaaS system based on the address of the proxy and the address of the requesting logic of the iPaaS system.

9. A data transmission apparatus for service integration, comprising:
processing circuitry configured to
receive, by a gateway of an integration platform as a service (iPaaS) system, a data transmission request transmitted by the iPaaS system, the iPaaS system being deployed on a first virtual private cloud (VPC) in a cloud network, the data transmission request includes a request from the iPaaS system to access a service;
determine, by the gateway based on service configuration information, an address identifier of the service to be accessed by the iPaaS system, and a first transmission connection between the gateway and a data transmission circuitry associated with the service, the data transmission circuitry being an agent deployed in an Intranet, the service being deployed in the Intranet or in a second VPC, and the first transmission connection being established based on a first connection establishment request initiated by the data transmission circuitry, the address identifier of the service comprising at least one of an IP address or a port number; and transmit the data transmission request and the address identifier of the service from the gateway to the data transmission circuitry through the first transmission connection, the data transmission circuitry being configured to query an agent connection register, and the data transmission circuitry being configured to transmit, based on the query associated with the address identifier, the data transmission request of the iPaaS system to the service.

10. The apparatus according to claim 9, wherein the processing circuitry is further configured to:

before receiving the data transmission request, establish the first transmission connection with the data transmission circuitry in response to receiving the first connection establishment request initiated by the data transmission circuitry, the first connection establishment request comprising services associated with the data transmission circuitry; and allocate, for each service of the services associated with the data transmission circuitry, a proxy address to the respective service, and add a corresponding relationship between an address identifier of the respective service and the proxy address to the service configuration information.

11. The apparatus according to claim 9, wherein the data transmission request is transmitted by the iPaaS system through a second transmission connection established between requesting logic of the iPaaS system and the gateway; and the processing circuitry is further configured to:

query the service configuration information based on an identifier of the second transmission connection to obtain the address identifier of the service, and to identify the first transmission connection between the gateway and an data transmission circuitry of the service; and determine, by the data transmission circuitry based on the address identifier, a third transmission connection established between the data transmission circuitry and the service, and transmitting, through the third transmission connection, the data transmission request of the iPaaS system to the service to be accessed by the iPaaS system.

12. The apparatus according to claim 11, wherein the processing circuitry is further configured to:

receive, through the first transmission connection, response data returned by the data transmission circuitry and the address identifier of the service, the response data being transmitted to the data transmission circuitry by the service through the third transmission connection;

query the service configuration information based on the address identifier of the service to obtain an identifier of the second transmission connection; and transmit the response data to the requesting logic of the iPaaS system through the second transmission connection based on the identifier of the second transmission connection.

13. The apparatus according to claim 11, wherein the processing circuitry is further configured to:

before receiving the data transmission request, establish the second transmission connection with the requesting logic of the iPaaS system in response to receiving a second connection establishment request transmitted by the requesting logic of the iPaaS system;

query the service configuration information based on a proxy address requested by the second connection establishment request to obtain the address identifier of the service, and to identify the first transmission connection for data transmission with the data transmission circuitry of the service; and transmit a third connection establishment request to the data transmission circuitry based on the identified first transmission connection, the third connection establishment request carrying the address identifier of the service, and the data transmission circuitry establishing the third transmission connection with the service based on the address identifier of the service in the third connection establishment request.

14. The apparatus according to claim 9, wherein the processing circuitry is further configured to:

acquire an address of requesting logic of the iPaaS system that transmitted the data transmission request, an address of a proxy which received the data transmission request, and an address of the service to be accessed by the requesting logic of the iPaaS system;

query a gateway connection register based on the address of the requesting logic of the iPaaS system and the address of the proxy to obtain the address identifier of the service to be accessed by the requesting logic of the iPaaS system;

query the service configuration information based on the address of the proxy to obtain the first transmission connection between the gateway and the data transmission circuitry of the service; and transmit the data transmission request, the address of the service and the address identifier of the service to the data transmission circuitry through the first transmission connection, the data transmission circuitry being configured to query an agent connection register based on the address identifier, determining the address of the service, and transmit, through the address of the data transmission circuitry and the address of the service, the data transmission request of the requesting logic of the iPaaS system to the service to be accessed by the requesting logic of the iPaaS system.

\* \* \* \* \*